US010336469B2

(12) United States Patent
Mallinson

(10) Patent No.: US 10,336,469 B2
(45) Date of Patent: Jul. 2, 2019

(54) UNMANNED AERIAL VEHICLE MOVEMENT VIA ENVIRONMENTAL INTERACTIONS

(71) Applicant: SONY INTERACTIVE ENTERTAINMENT INC., Tokyo (JP)

(72) Inventor: Dominic Saul Mallinson, Redwood City, CA (US)

(73) Assignee: SONY INTERACTIVE ENTERTAINMENT INC., Tokyo (JP)

( * ) Notice: Subject to any disclaimer, the term of this patent is extended or adjusted under 35 U.S.C. 154(b) by 0 days.

(21) Appl. No.: 15/711,961

(22) Filed: Sep. 21, 2017

(65) Prior Publication Data

US 2018/0093781 A1 Apr. 5, 2018

Related U.S. Application Data

(63) Continuation-in-part of application No. 15/711,695, filed on Sep. 21, 2017.

(Continued)

(51) Int. Cl.
*B64F 1/04* (2006.01)
*B64C 27/08* (2006.01)
*B64C 39/02* (2006.01)

(52) U.S. Cl.
CPC .............. *B64F 1/04* (2013.01); *B64C 27/08* (2013.01); *B64C 39/024* (2013.01); *B64C 2201/108* (2013.01)

(58) Field of Classification Search
CPC .. A63H 27/12; A63H 30/04; B64C 2201/146; B64C 2201/10; B64C 39/024; A63F 7/0664; A63F 7/07; A63F 7/20

(Continued)

(56) References Cited

U.S. PATENT DOCUMENTS 3,279,863 A * 10/1966 Zuppiger ................. B60V 3/04
                                                                406/19
3,367,658 A *  2/1968 Bayha .................. A63H 18/002
                                                                406/88

(Continued)

FOREIGN PATENT DOCUMENTS

WO    WO 2018/063594    4/2018

OTHER PUBLICATIONS

Fujii, Katsuya; Higuchi, Keita; Rekimoto, Jun; "Endless Flyer: A Continuous Flying Drone with Automatic Battery Replacement", 2013 IEEE 10th International Conference on Ubiquitous Intelligence & Computing and 2013 IEEE 10th International Conference on Autonomic & Trusted Computing, pp. 216-223.

(Continued)

*Primary Examiner* — Michael A Cuff
(74) *Attorney, Agent, or Firm* — Polsinelli LLP

(57) ABSTRACT

An arena includes a porous surface through which an airflow is output, thereby providing lift for an unmanned aerial vehicle (UAV) to push the UAV away from the porous surface. The airflow may also provide thrust to push the UAV in a direction that is parallel to the porous surface. The UAV may include one or more propellers that can provide lift, thrust, or both to the UAV. The airflow may be modified over a duration of time to modify lift or thrust to the UAV. The airflow may be modified based on regions of the arena to modify lift or thrust in different regions of the arena. The arena may include a scoreboard to display a score that may be modified as a result of actions undertaken by the UAV. Two or more UAVs may be used to play a game via the arena.

20 Claims, 15 Drawing Sheets

Related U.S. Application Data

(60) Provisional application No. 62/402,826, filed on Sep. 30, 2016.

(58) Field of Classification Search
USPC .............................................. 273/108, 108.1
See application file for complete search history.

(56) References Cited

U.S. PATENT DOCUMENTS

| | | | |
|---|---|---|---|
| 6,021,646 A * | 2/2000 | Burley | A63C 19/10 |
| | | | 165/45 |
| 6,075,924 A * | 6/2000 | Will | B64C 39/024 |
| | | | 700/247 |
| 6,236,365 B1 | 5/2001 | LeBlanc et al. | |
| 6,254,394 B1 | 7/2001 | Draper et al. | |
| 7,988,154 B1 * | 8/2011 | Regan, Jr. | A63F 7/0023 |
| | | | 273/317 |
| 8,025,293 B1 * | 9/2011 | Crawford | A63F 7/06 |
| | | | 273/126 A |
| 8,909,391 B1 | 12/2014 | Peeters et al. | |
| 9,061,102 B2 * | 6/2015 | Levien | G05D 1/0011 |
| 9,442,485 B1 | 9/2016 | McDermott et al. | |
| 9,605,926 B1 | 3/2017 | Means et al. | |
| 10,062,292 B2 * | 8/2018 | Blomberg | G08G 5/0039 |
| 10,067,736 B2 | 9/2018 | Taylor | |
| 10,137,984 B1 | 11/2018 | Flick | |
| 10,210,905 B2 | 2/2019 | Castleman | |
| 2003/0102016 A1 * | 6/2003 | Bouchard | H01L 21/67028 |
| | | | 134/32 |
| 2003/0152892 A1 | 8/2003 | Huang et al. | |
| 2004/0008253 A1 | 1/2004 | Monroe | |
| 2004/0115593 A1 * | 6/2004 | Hatlestad | B64D 23/00 |
| | | | 434/29 |
| 2004/0172187 A1 | 9/2004 | Wiseman | |
| 2005/0004723 A1 | 1/2005 | Duggan et al. | |
| 2005/0283281 A1 | 12/2005 | Hartmann et al. | |
| 2006/0095262 A1 | 5/2006 | Danielli | |
| 2006/0169508 A1 * | 8/2006 | Trojahn | A63G 25/00 |
| | | | 180/117 |
| 2007/0061116 A1 | 3/2007 | Bush | |
| 2007/0102876 A1 * | 5/2007 | Giegerich | A63F 7/066 |
| | | | 273/108.1 |
| 2007/0130599 A1 | 6/2007 | Monroe | |
| 2008/0073839 A1 * | 3/2008 | Nally | A63F 7/0017 |
| | | | 273/126 R |
| 2008/0093796 A1 * | 4/2008 | Narus | A63B 67/04 |
| | | | 273/108.1 |
| 2008/0144884 A1 | 6/2008 | Habibi | |
| 2008/0154447 A1 | 6/2008 | Spinelli | |
| 2008/0177994 A1 | 7/2008 | Mayer | |
| 2008/0221745 A1 | 9/2008 | Diamandis et al. | |
| 2009/0005167 A1 | 1/2009 | Arrasvuori et al. | |
| 2009/0076665 A1 | 3/2009 | Hoisington et al. | |
| 2009/0087029 A1 | 4/2009 | Coleman et al. | |
| 2009/0118896 A1 | 5/2009 | Gustafsson | |
| 2009/0125163 A1 | 5/2009 | Duggan et al. | |
| 2009/0187389 A1 | 7/2009 | Dobbins et al. | |
| 2009/0265105 A1 | 10/2009 | Davis et al. | |
| 2010/0083038 A1 | 4/2010 | Pierce et al. | |
| 2010/0096491 A1 | 4/2010 | Whitelaw et al. | |
| 2010/0121574 A1 | 5/2010 | Ariyur et al. | |
| 2010/0228468 A1 | 9/2010 | D'Angelo | |
| 2010/0305724 A1 | 12/2010 | Fry et al. | |
| 2011/0106339 A1 * | 5/2011 | Phillips | G05D 1/0033 |
| | | | 701/2 |
| 2011/0184590 A1 | 7/2011 | Duggan et al. | |
| 2012/0035799 A1 * | 2/2012 | Ehrmann | A63F 7/0664 |
| | | | 701/28 |
| 2012/0188078 A1 | 7/2012 | Soles et al. | |
| 2012/0212399 A1 | 8/2012 | Border et al. | |
| 2012/0232867 A1 | 9/2012 | Ahrens et al. | |
| 2013/0128054 A1 | 5/2013 | Densham et al. | |
| 2013/0137066 A1 | 5/2013 | Pollak et al. | |
| 2013/0328927 A1 | 12/2013 | Mount et al. | |
| 2014/0244075 A1 | 8/2014 | Litwinowicz et al. | |
| 2014/0324253 A1 | 10/2014 | Duggan et al. | |
| 2015/0063610 A1 | 3/2015 | Mossner | |
| 2015/0209659 A1 * | 7/2015 | Barr | A63B 67/04 |
| | | | 273/126 A |
| 2015/0248785 A1 | 9/2015 | Holmquist | |
| 2015/0323931 A1 | 11/2015 | Downey et al. | |
| 2015/0346722 A1 | 12/2015 | Herz et al. | |
| 2016/0035224 A1 | 2/2016 | Yang et al. | |
| 2016/0078759 A1 | 3/2016 | Nerayoff et al. | |
| 2016/0091894 A1 | 3/2016 | Zhang et al. | |
| 2016/0111006 A1 | 4/2016 | Srivastava et al. | |
| 2016/0117931 A1 | 4/2016 | Chan et al. | |
| 2016/0196754 A1 | 7/2016 | Surace | |
| 2016/0205654 A1 | 7/2016 | Robinson | |
| 2016/0217698 A1 | 7/2016 | Liu et al. | |
| 2016/0253908 A1 | 9/2016 | Chambers et al. | |
| 2016/0257001 A1 * | 9/2016 | Blasdel | B25J 9/1664 |
| 2016/0291593 A1 | 10/2016 | Hammond et al. | |
| 2016/0299506 A1 | 10/2016 | Bruggeman et al. | |
| 2016/0330601 A1 | 11/2016 | Srivastava | |
| 2016/0358497 A1 | 12/2016 | Nguyen et al. | |
| 2017/0039859 A1 | 2/2017 | Hu et al. | |
| 2017/0045886 A1 | 2/2017 | Liu et al. | |
| 2017/0053169 A1 | 2/2017 | Cuban et al. | |
| 2017/0061813 A1 | 3/2017 | Tao et al. | |
| 2017/0069214 A1 | 3/2017 | Dupray et al. | |
| 2017/0116723 A1 | 4/2017 | Aughey | |
| 2017/0158353 A1 | 6/2017 | Schmick | |
| 2017/0168488 A1 | 6/2017 | Wierzynski et al. | |
| 2017/0182407 A1 | 6/2017 | Steele et al. | |
| 2017/0251323 A1 | 8/2017 | Jo et al. | |
| 2017/0295446 A1 | 10/2017 | Thagadur | |
| 2017/0329347 A1 | 11/2017 | Passot et al. | |
| 2017/0337826 A1 | 11/2017 | Moran et al. | |
| 2017/0371353 A1 | 12/2017 | Millinger | |
| 2017/0372617 A1 | 12/2017 | Bruno et al. | |
| 2018/0039262 A1 | 2/2018 | Fox et al. | |
| 2018/0046187 A1 | 2/2018 | Martirosyan et al. | |
| 2018/0046560 A1 * | 2/2018 | Gillies | H04W 4/029 |
| 2018/0093171 A1 | 4/2018 | Mallinson | |
| 2018/0093768 A1 | 4/2018 | Castleman | |
| 2018/0094931 A1 | 4/2018 | Taylor | |
| 2018/0095433 A1 | 4/2018 | Rico | |
| 2018/0095461 A1 | 4/2018 | Taylor | |
| 2018/0095463 A1 | 4/2018 | Castleman | |
| 2018/0095714 A1 | 4/2018 | Taylor | |
| 2018/0096455 A1 | 4/2018 | Taylor | |
| 2018/0096611 A1 | 4/2018 | Kikuchi | |
| 2018/0098052 A1 | 4/2018 | Black | |
| 2018/0329413 A1 | 11/2018 | Charalambides et al. | |
| 2019/0047700 A1 | 2/2019 | Liu et al. | |
| 2019/0079722 A1 | 3/2019 | Taylor | |

OTHER PUBLICATIONS

U.S. Appl. No. 15/394,391 Office Action dated Feb. 23, 2018.
U.S. Appl. No. 15/393,855 Office Action dated May 16, 2018.
U.S. Appl. No. 15/394,473, Dennis Castleman, UAV Battery Form Factor and Insertion/Ejection Methodologies, filed Dec. 29, 2016.
U.S. Appl. No. 15/394,511, Michael Taylor, Course Profiling and Sharing, filed Dec. 29, 2016.
U.S. Appl. No. 15/394,391, Dennis D. Castleman, Remote Controlled Object Macro and Autopilot System, filed Dec. 29, 2016.
U.S. Appl. No. 15/394,329, Javier F. Rico, Mechanical Effects by Way of Software or Real World Engagement, filed Dec. 29, 2016.
U.S. Appl. No. 15/394,267, Megumi Kikuchi, Collision Detection and Avoidance, filed Dec. 29, 2016.
U.S. Appl. No. 15/394,285, Michael Taylor, Steering Assist, filed Dec. 29, 2016.
U.S. Appl. No. 15/394,313, Michael Taylor, Proximity Based Noise and Chat, filed Dec. 29, 2016.
U.S. Appl. No. 15/393,855, Glenn Black, Translation of Physical Object Viewed by Unmanned Aerial Vehicle Into Virtual World Object, filed Dec. 29, 2016.
U.S. Appl. No. 15/711,695, Dominic S. Mallinson, Unmanned Aerial Vehicle Movement via Environmental Airflow, filed Sep. 21, 2017.

(56) References Cited

OTHER PUBLICATIONS

U.S. Appl. No. 15/393,875, Michael Taylor, UAV Positional Anchors, filed Dec. 29, 2016.
Williams, Elliot; "Real-life Space Invaders with Drones and Lasers," Hackaday, Sep. 19, 2016.
PCT Application No. PCT/US2017/048064 International Search Report and Written Opinion dated Nov. 7, 2017.
U.S. Appl. No. 15/394,313 Office Action dated Oct. 18, 2017.
U.S. Appl. No. 15/394,391 Office Action dated Aug. 24, 2018.
U.S. Appl. No. 15/394,329 Office Action dated Aug. 7, 2018.
U.S. Appl. No. 15/394,267 Office Action dated Aug. 24, 2018.
U.S. Appl. No. 15/394,285 Office Action dated Aug. 3, 2018.
U.S. Appl. No. 15/393,855 Final Office Action dated Oct. 12, 2018.
U.S. Appl. No. 15/711,695 Office Action dated Oct. 5, 2018.
U.S. Appl. No. 16/121,441, Michael Taylor, Proximity Based Noise and Chat, filed Sep. 4, 2018.
Bai, Z., Blackwell, A., Coulouris, G.; Using augmented reality to elicit pretend play for children with autism. IEEE Transactions on Visualization & Computer Graphics. May 2015 1(1):1.
Thon S, Serena-Allier D, Salvetat C, Lacotte F.; "Flying a dron in a museum an augmented-reality serious game in a Provence", InDigital Heritage International Congress (DigitalHeritage), Oct. 28, 2013 (vol. 2, pp. 669-676), IEEE. (Year: 2013).
U.S. Appl. No. 15/394,329 Final Office Action dated Feb. 25, 2019.
U.S. Appl. No. 15/394,285 Final Office Action dated Feb. 26, 2019.
U.S. Appl. No. 15/393,855 Office Action dated Feb. 1, 2019.
PCT Application No. PCT/US2017/048064 International Preliminary Report on Patentability dated Apr. 2, 2019.
U.S. Appl. No. 15/394,267 Final Office Action dated Apr. 19, 2019.

\* cited by examiner

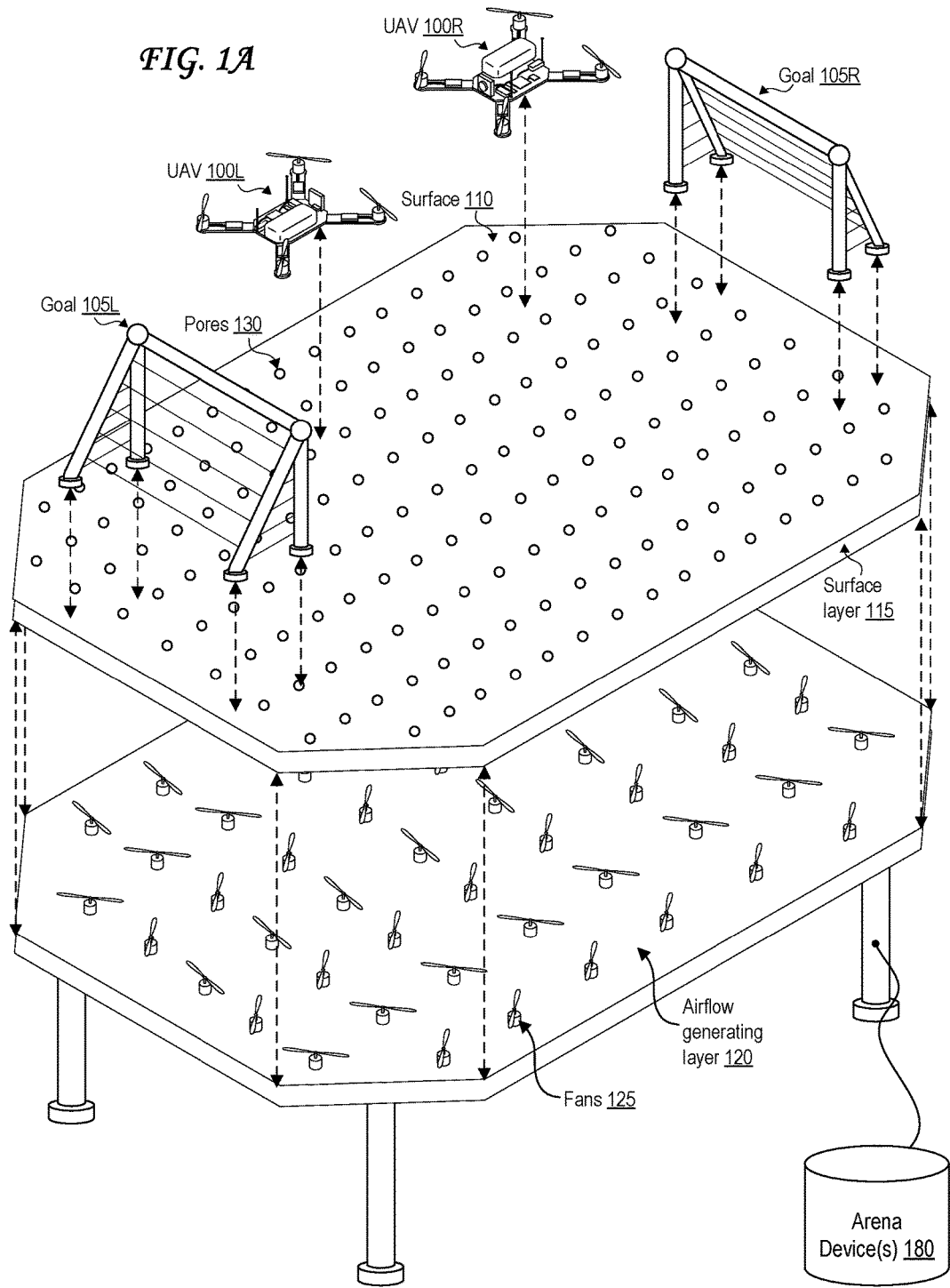

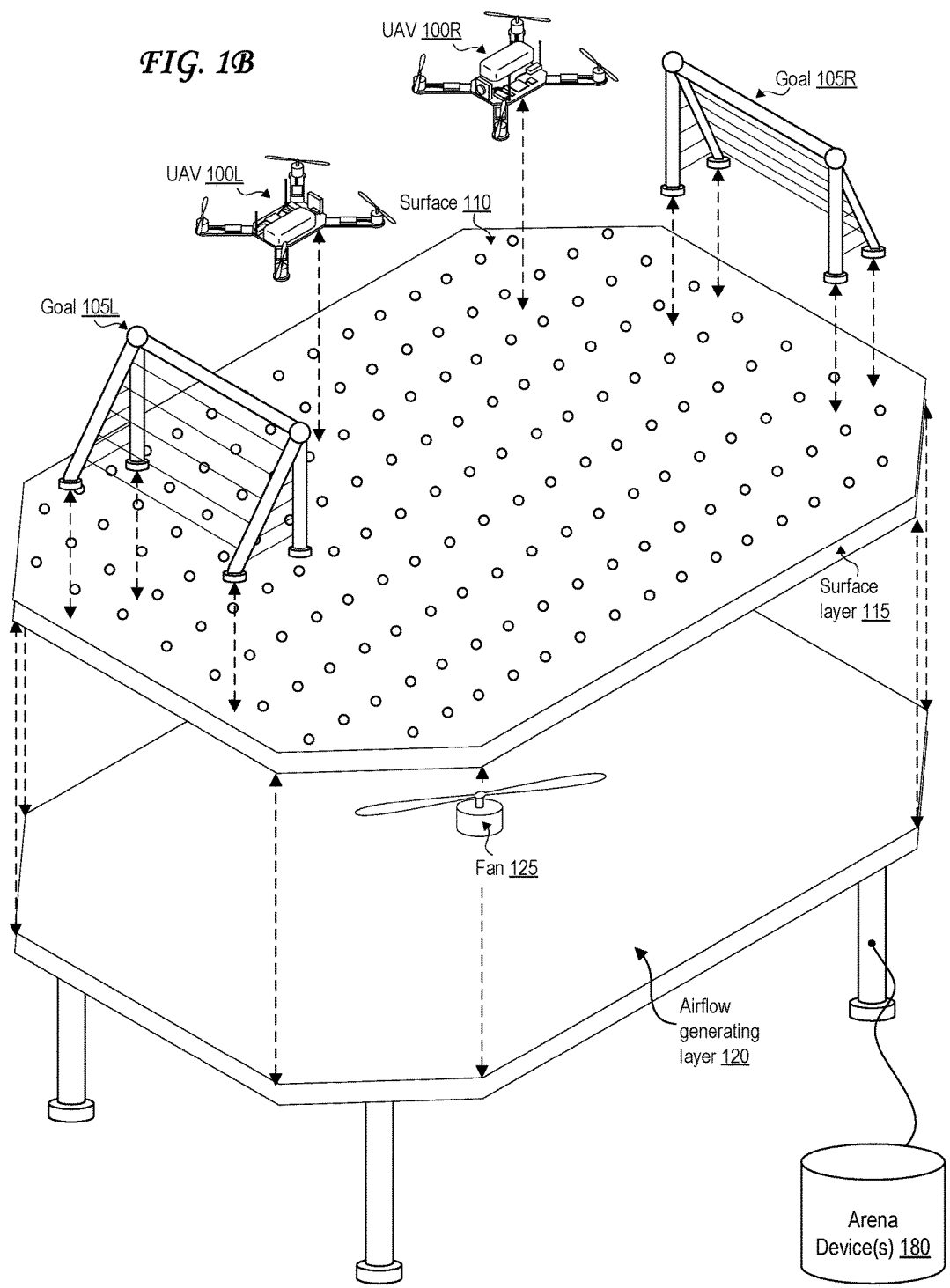

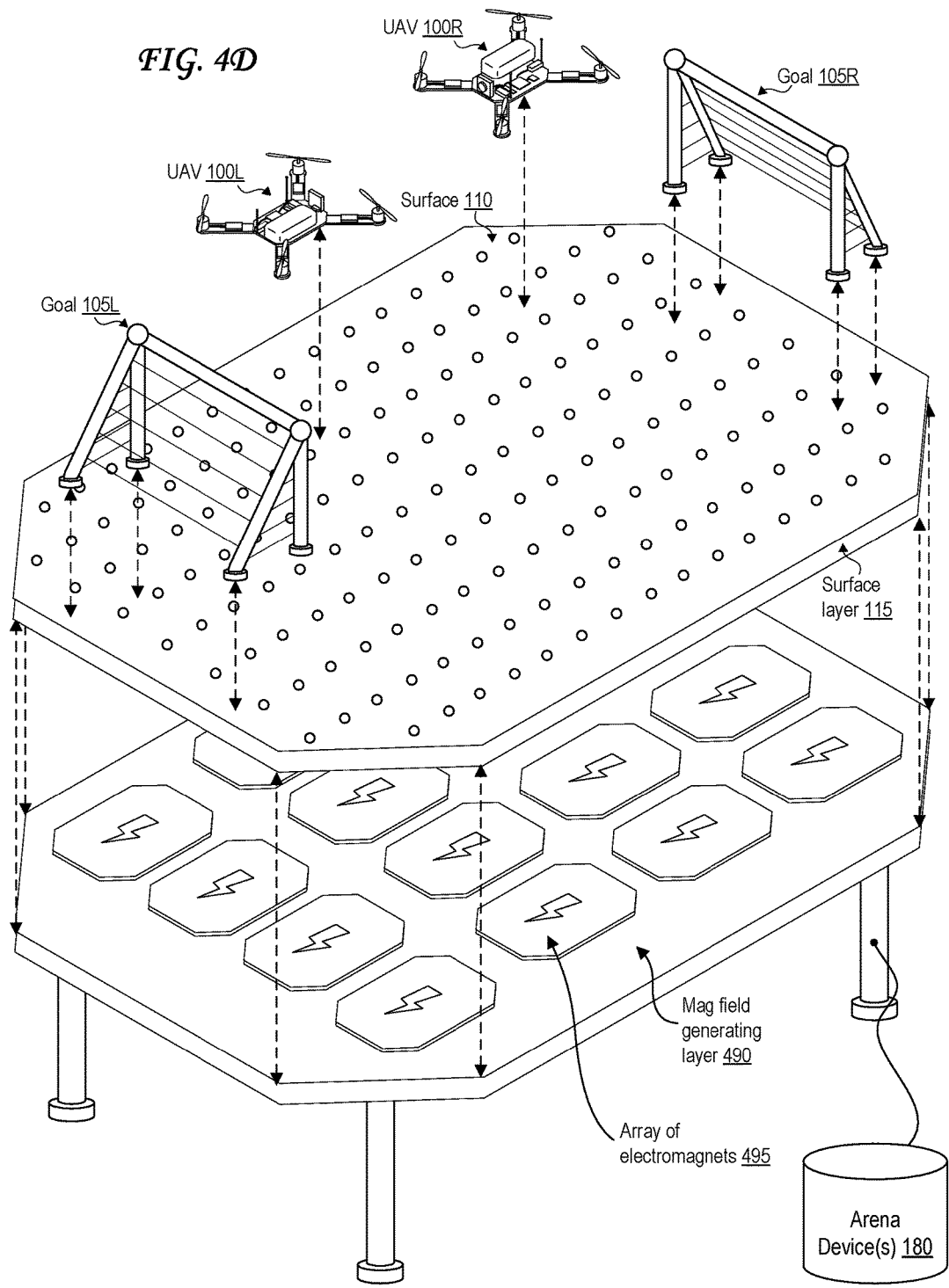

UNMANNED AERIAL VEHICLE MOVEMENT VIA ENVIRONMENTAL INTERACTIONS

CROSS-REFERENCE TO RELATED APPLICATIONS

The present application is a continuation-in-part and claims the priority benefit of U.S. patent application Ser. No. 15/711,695 filed Sep. 21, 2017 and entitled "Unmanned Aerial Vehicle Movement via Environmental Airflow," which claims the priority benefit of U.S. provisional application No. 62/402,826 filed Sep. 30, 2016 and entitled "Unmanned Aerial Vehicle Movement via Environmental Airflow," the disclosures of which are incorporated herein by reference.

BACKGROUND

1. Field of the Invention

The present invention generally concerns unmanned aerial vehicles, airflow manipulation, and computer vision. More particularly, the present invention concerns controlling movement of an unmanned aerial vehicle by controlling airflow in an environment capable of generating airflow, and manipulation of a camera feed from the unmanned aerial vehicle.

2. Description of the Related Art

Unmanned aerial vehicles (UAVs), sometimes referred to as "drones," are aerial vehicles that are either autonomous, remote-controlled by a user with a control transmitter, or some combination thereof. UAVs can sometimes include cameras that record images or videos of the physical world as seen by the field of view of the camera.

Augmented reality refers to a view of a physical, real-world environment whose elements are augmented or supplemented by computer-generated sensory input. For example, augmented reality may include the view of the physical environment with text or images adding to or replacing elements of the view of the physical environment. Augmented reality may also insert or replace sounds with computer-generated sounds.

Virtual reality refers to technologies that generate, typically via computer software, a virtual world environment whose elements have little or no relationship to any physical, real-world environment. A virtual reality experience is typically intended to replace, rather than augment or supplement, an experience of any physical reality. Virtual reality typically includes entirely computer-generated graphics and sounds.

Display technologies include display screens, such as liquid crystal display (LCD) display screens or organic light emitting diode (OLED) screens. Display technologies also include projectors, such as movie projectors. Displays can be included in typical monitors or televisions, in handheld devices such as cellular phones or tablet devices, or in head-mounted displays such as goggles or glasses.

SUMMARY OF THE PRESENTLY CLAIMED INVENTION

A first claimed embodiment of the present invention involves a system for movement control. The system includes an air propulsion device that generates an airflow. The system also includes a porous surface, wherein the airflow generated by the air propulsion device is output through a plurality of pores in the porous surface, wherein the airflow thereby provides lift to an unmanned vehicle, wherein at least a component of the lift is perpendicular to the porous surface and pushes the unmanned vehicle away from the porous surface. The system also includes a communication transceiver that receives an airflow modification signal from a controller device, wherein the air propulsion device modifies the airflow in response to receipt of the airflow modification signal at the communication transceiver.

A second claimed embodiment of the present invention concerns a system for movement control. The system includes a body, wherein the body is lifted away from a porous surface at least in part by an airflow expelled through a plurality of pores in the porous surface. The system also includes a motor coupled to the body, and a propeller coupled to the motor, wherein actuation of the motor causes the propeller to spin, thereby generating a thrust, wherein at least a component of the thrust is parallel to the porous surface. The system also includes a communication transceiver that receives an actuation signal from a controller device, wherein the motor is actuated in response to receipt of the actuation signal.

A third-claimed embodiment of the present invention concerns a method for movement control. The method includes transmitting an activation signal to an arena system, wherein the arena system generates an airflow in response to receipt of the activation signal, the airflow providing lift to an unmanned vehicle. The method also includes receiving a thrust input via an input interface and transmitting a thrust signal to the unmanned vehicle, wherein the unmanned aerial vehicle actuates a motorized propeller in response to receipt of the thrust signal, the motorized propeller providing thrust to the unmanned vehicle, wherein at least a component of the thrust is perpendicular to a component of the lift.

BRIEF DESCRIPTION OF THE DRAWINGS

FIG. 1A illustrates an exploded view of an arena system with multiple fans, two unmanned aerial vehicles (UAVs), and two goals.

FIG. 1B illustrates an exploded view of an arena system with a single fan, two unmanned aerial vehicles (UAVs), and two goals.

FIG. 4D illustrates an exploded view of an arena system with an array of electromagnets, two unmanned aerial vehicles (UAVs), and two goals.

DETAILED DESCRIPTION

An arena includes a porous surface through which an airflow is output, thereby providing lift for an unmanned aerial vehicle (UAV) to push the UAV away from the porous surface. The airflow may also provide thrust to push the UAV in a direction that is parallel to the porous surface. The UAV may include one or more propellers that can provide lift, thrust, or both to the UAV. The airflow may be modified over a duration of time to modify lift or thrust to the UAV. The airflow may be modified based on regions of the arena to modify lift or thrust in different regions of the arena. The arena may include a scoreboard to display a score that may be modified as a result of actions undertaken by the UAV. Two or more UAVs may be used to play a game via the arena. The airflow may be output through the pores via exhaust channels or columns, which optionally may be steerable. The arena may alternatively or additionally use one or more electromagnets to provide lift and/or thrust to the UAV(s) by interacting with magnet(s) in the UAV(s).

FIG. 1A illustrates an exploded view of an arena system with multiple fans, two unmanned aerial vehicles (UAVs), and two goals.

The arena system of FIG. 1A is illustrated as a raised table, but may be lowered to the ground in another embodiment. The arena system includes an airflow generating layer 120 and a surface layer 115.

The arena system of FIG. 1A also includes one or more arena devices 180, which are computing devices 1100. References hereafter to a single arena device 180 should be understood to apply to multiple arena devices 180 as well. The arena device 180 may aid in controlling operations of the arena hardware via hardware of the arena device 180, software stored in one or more memory units of the arena device 180 and executed via one or more processors of the arena device 180, or some combination thereof. While the arena device 180 of FIG. 1A is illustrated as connected to the arena of FIG. 1A through a wire, it may alternately be connected to the arena of FIG. 1A wirelessly via Bluetooth, Wi-Fi, cellular signals, infrared, or some combination thereof. Likewise, the arena device 180 of FIG. 1A may communicate with the left unmanned aerial vehicle (UAV) 110L and the right unmanned aerial vehicle (UAV) 110R wirelessly via Bluetooth, Wi-Fi, cellular signals, infrared, or some combination thereof.

Figure 10A:
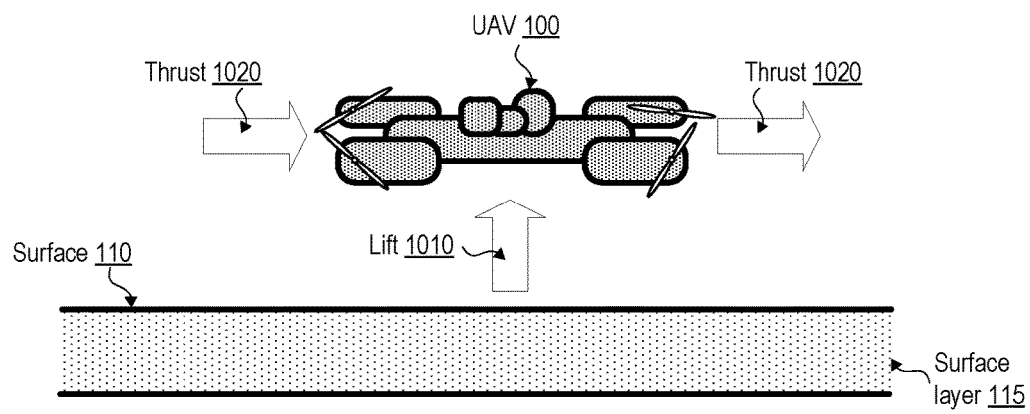
FIG. 10A illustrates a side view of an unmanned aerial vehicle (UAV) experiencing lift and thrust.
Figure 10B:
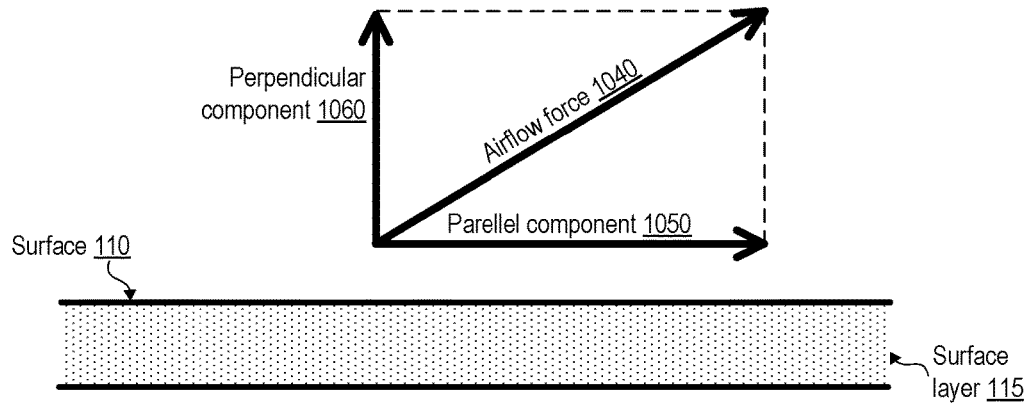
FIG. 10B illustrates a force diagram of an airflow output by the arena.

The airflow generating layer 120 of FIG. 1A includes multiple fans 125 that generate an airflow, where at least a component of the airflow is directed vertically toward the surface layer 115 as illustrated in FIG. 10B. These fans 125 may be controlled by the arena device 180, by a controller transmitter 800, or some combination thereof.

The airflow generated by the fans 125 at the airflow generating layer 120 is then output through pores 130 in a surface 110 of the surface layer 115. That is, the surface 110 is a porous surface. The surface 110 is illustrated having readily visible holes as the pores 130, but in other cases, the surface 110 may be made at least partially of a naturally porous fabric or other material whose pores are not easily visible with the naked eye.

A left unmanned aerial vehicle (UAV) 110L and a right unmanned aerial vehicle (UAV) 110R are also illustrated in FIG. 1A. While the UAVs 100 are illustrated as traditional UAVs 100 propelled fully by motorized propellers, the UAVs need not have any propellers at all. Instead, the UAVs 100 of FIG. 1A may be lifted above the surface 110 via lift 1010 provided by the airflow 430 generated by the fans 125 of the airflow generating layer 120, much like an air hockey puck as illustrated further in FIG. 4B and FIG. 10A. The UAVs 100 may also include motorized propellers to supplement or replace the lift 1010 supplied by the airflow. Horizontal thrust 1020 may also be provided by the airflow, by the motorized propellers of the UAV 100, or some combination thereof, as illustrated further in FIG. 10A.

In some cases, each of the fans 125 can be actuated with motors to tilt the fans 125 and thereby control a direction of airflow output through the pores 130 of the surface 110. A steerable ball joint much like the one illustrated in FIG. 4C can be used for this purpose. The fans 125 can be controlled all together, separately, or in groups. Movement and tilting of the fans 125 can be actuated autonomously, actuated automatically in response to an input, or manually steered in response to an input. That is, the actuated mechanisms for moving/tilting the fans 125 can be actuated in response to receipt of a signal from a user control interface, in response to receipt of a signal from a UAV 100, in response to receipt of a signal from the arena device(s) 180, or some combination thereof. The actuated mechanisms for moving/tilting the fans 125 can be actuated to create regional airflow effects 410 as in FIG. 4A, to help steer and/or propel and/or lift a UAV 100, to compensate for undesirable airflow effects such as vortices within the airflow generating layer 120 and/or external to it, to correct and/or compensate for an error or defect in a fan 125 or pore 130 or channel 450, or some combination thereof.

The arena system of FIG. 1A also includes a left goal 105L and a right goal 105R. These may be used in the process of operating a game involving the left unmanned aerial vehicle (UAV) 110L and the right unmanned aerial vehicle (UAV) 110R.

FIG. 1B illustrates an exploded view of an arena system with a single fan, two unmanned aerial vehicles (UAVs), and two goals.

The arena system of FIG. 1B is identical to the arena system of FIG. 1A except that the airflow generating layer 120 of FIG. 1B only includes a single fan 125. The airflow 430 generated by the single fan 125 may be channeled by additional components of the airflow generating layer 120 and/or of the surface layer 115, such as tubes, that allow the airflow generated by the single fan 125 to be output relatively evenly out of each of the pores 130 of the surface 110.

While the single fan 125 of FIG. 1B is illustrated pointing straight "up"—that is, perpendicular to the surface 110—this need not be the case. The fan 125 can be pointed in any direction and can be placed wherever air is accessible. For example, the fan 125 can be positioned in an air intake port 420 positioned along a bottom or a side of an air chamber of the airflow generating layer 120 as illustrated in FIG. 4B.

A large arena system may also include a few fans 125 similar to the one in FIG. 1B, with the airflow 430 generated by each fan 125 channeled to be output relatively evenly out of each of the pores 130 of a region of the surface 110.

Figure 1C:
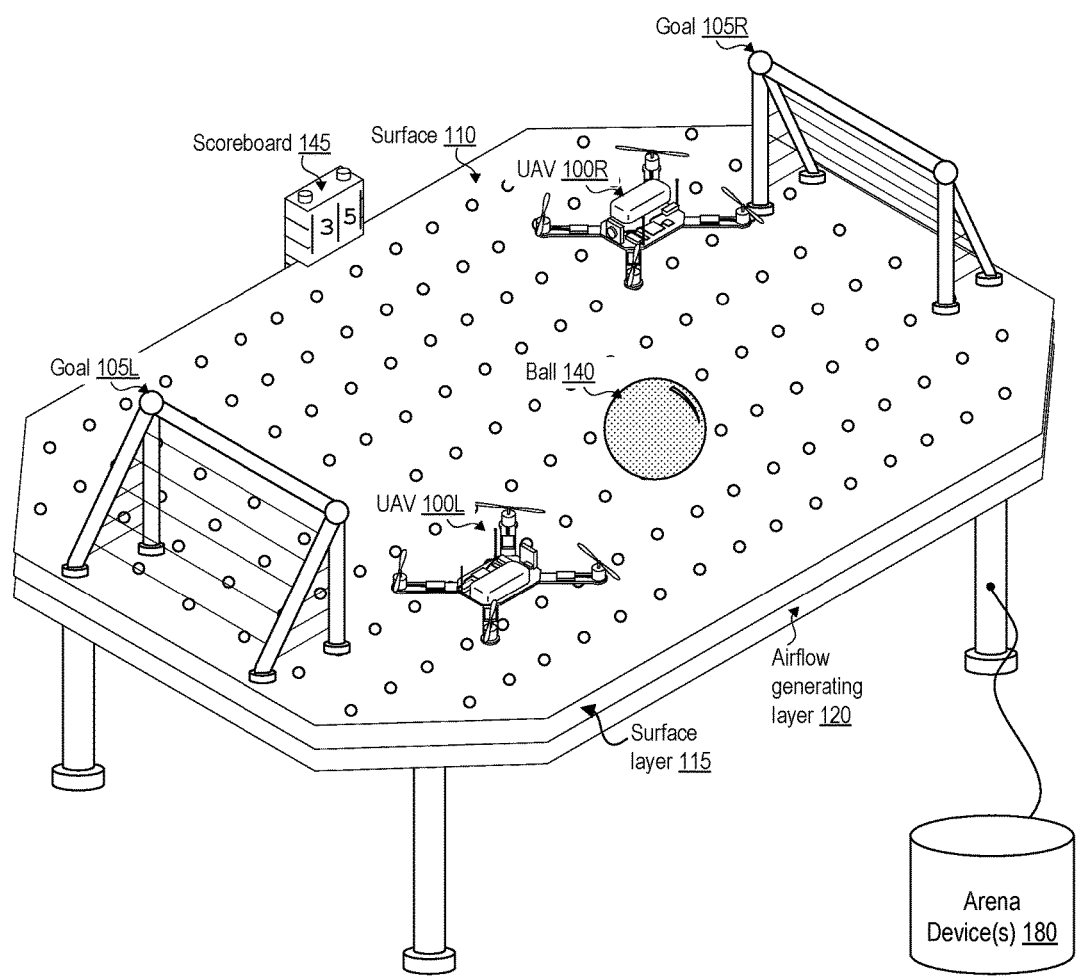
FIG. 1C illustrates a perspective view of an arena system with two unmanned aerial vehicles (UAVs), two goals, a ball, and a scoreboard.

FIG. 1C illustrates a perspective view of an arena system with two unmanned aerial vehicles (UAVs), two goals, a ball, and a scoreboard.

The arena system of FIG. 1C is similar to the arena systems of FIG. 1A and FIG. 1B, though all of the parts described in those figures are put together rather than illustrated in an exploded view. The arena system of FIG. 1C also adds a ball 140 and a scoreboard 145. The scoreboard 145 is illustrated as displaying a score of three (3) to five (5). The scoreboard 145 may be used in the playing of a game involving the arena system of FIG. 1C, the ball 140, the left unmanned aerial vehicle (UAV) 110L, the right unmanned aerial vehicle (UAV) 110R, the left goal 105L, and the right goal 105R.

One or more of a bottom, side, or other portion of the airflow generating layer 120 of FIG. 1A or FIG. 1B can also include one or more pores, vents, or other openings to provide an air intake for the fan(s) 125. The air intake opening 420 of FIG. 4B is an example of this. In some cases, these pores or vents may include a filter or sieve to protect the fans from larger objects or particles entering.

The game illustrated in FIG. 1C may be a game similar to soccer, hockey, or air hockey. For example, the left unmanned aerial vehicle (UAV) 110L may score a point by pushing the ball 140 into the right goal 105R, and the right unmanned aerial vehicle (UAV) 110R may score a point by pushing the ball 140 into the left goal 105L.

Different implementations of such a game may use baskets or hoops instead of goals 105, much like basketball, and the UAVs 100 may have a motorized or spring-loaded claw or arm or catapult to help launch the ball 140 into such a basket or hoop. Different implementations of such a game may use endzones instead of goals 105, much like in the sport of American football. Different implementations of such a e may use more than one ball 140. Different implementations of such a game may use pucks, Frisbee discs, a badminton shuttlecock, arrows/darts, or other projectiles in place of (or in addition to) balls 140. All references to the ball 140 herein should be understood to apply to any such projectiles in place of, or in addition to, the ball 140. Different implementations of such a game may use more UAVs 100, such as to have two teams of UAVs, with multiple UAVs 100 on each team, to make the game more similar to team sports such as soccer, basketball, lacrosse, American football, rugby, hockey, water polo, bocce ball, curling, or some combination thereof.

Sensors may be placed in the goals 105, along the surface 110, or elsewhere in the arena system to detect when the ball 140 has entered the goal. The sensors may notify the scoreboard 145 to increment the score corresponding to the appropriate UAV 100. The sensors may include pressure sensors, motion sensors, or cameras capable of recognizing the ball 140 via image recognition processes involving the arena device 180. The camera of either UAV 100 may also detect a successful goal and notify the scoreboard 145 of the goal. The sensors may include radar sensors, sonar sensors, lidar sensors, or some combination thereof. The sensors may include laser rangefinders. The ball 140 may include a wireless emitter, and the sensors may thus be receivers able to recognize when the ball is in the goal by the signals received by the ball. The ball itself 140 may include any such sensors as well, and may notify the scoreboard 145 of a successful goal itself. The sensors may also be located away from the surface 110, such as overhead or off to the side, by being mounted on a wall or ceiling or on another UAV 100 that serves as a "referee." The sensors may also include location sensors, such as GPS receivers, which may be particularly useful if the arena is large, or triangulation-based location sensors that triangulate a location from wireless signals emitted at different known locations. The sensors may include gyroscopes and/or accelerometers onboard each of the UAVs 100.

The wireless emitter may be a sound emitter, such as a speaker, that may emit audible sound at human hearing frequencies or inaudible sound at frequencies higher or lower than human hearing frequencies. The wireless emitter may be a different type of wireless emitter, such as a Bluetooth, wifi, cellular, visible light, infrared radiation, ultraviolet radiation, microwave radiation, or radio wave emitter.

A UAV 100 may "see" the ball 140 even when it is not in the field of view of the camera of the UAV 100 by using onboard receivers corresponding to the wireless emitter in the ball 140 to sense emissions 230 output by the ball 140 and use those to detect the location of the ball 140, for example by gauging when the signal gets stronger as the UAV 100 and/or ball 140 moves.

Figure 1D:
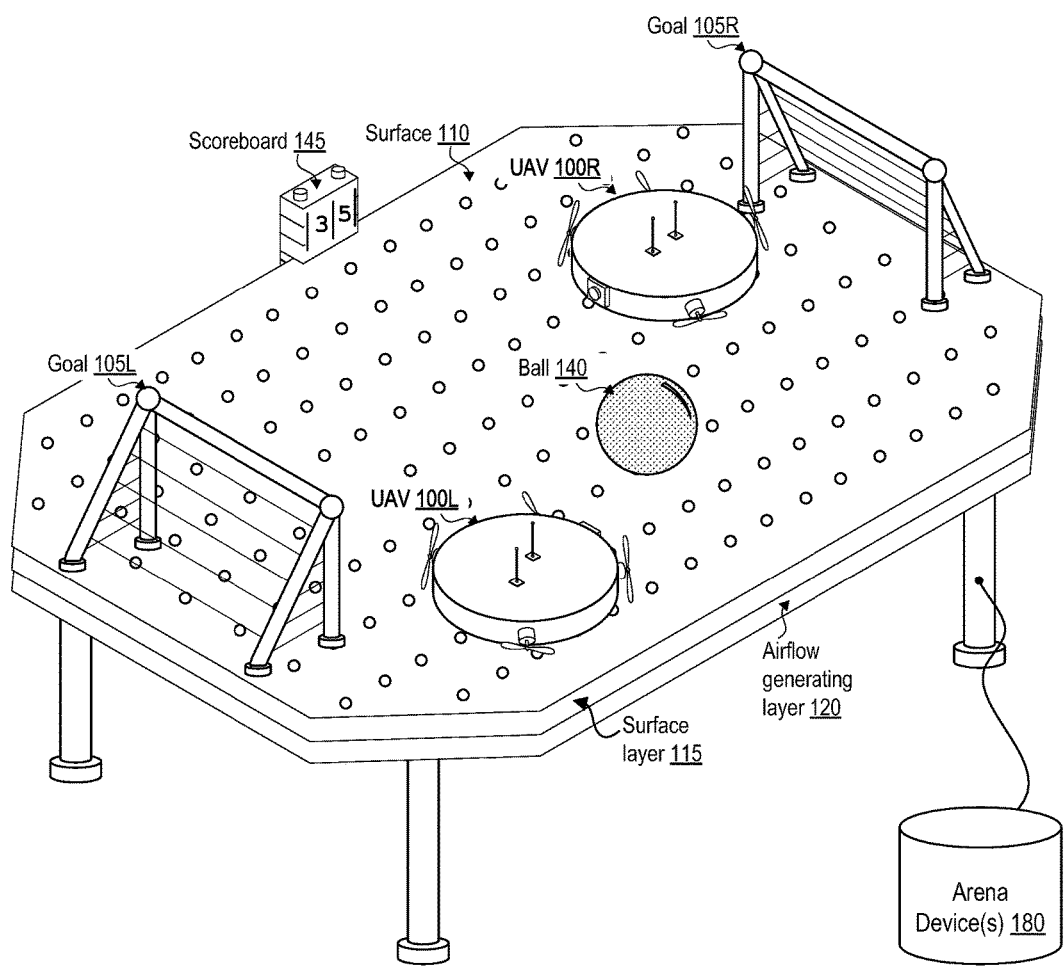
FIG. 1D illustrates a perspective view of the arena system of FIG. 1D with two disc-shaped unmanned aerial vehicles (UAVs).

FIG. 1D illustrates a perspective view of the arena system of FIG. 1D with two disc-shaped unmanned aerial vehicles (UAVs). In particular, the left UAV 100L and the right UAV 100R are both disc-shaped. The motorized propellers of these disc-shaped UAVs 100 are primarily for thrust 1020 rather than lift 1010; they instead rely on the airflow generated by the airflow generating layer 120 and output through the pores in the surface 110 for lift 1010. These disc-shaped unmanned aerial vehicles (UAVs) are further illustrated in FIG. 7B.

Figure 2:
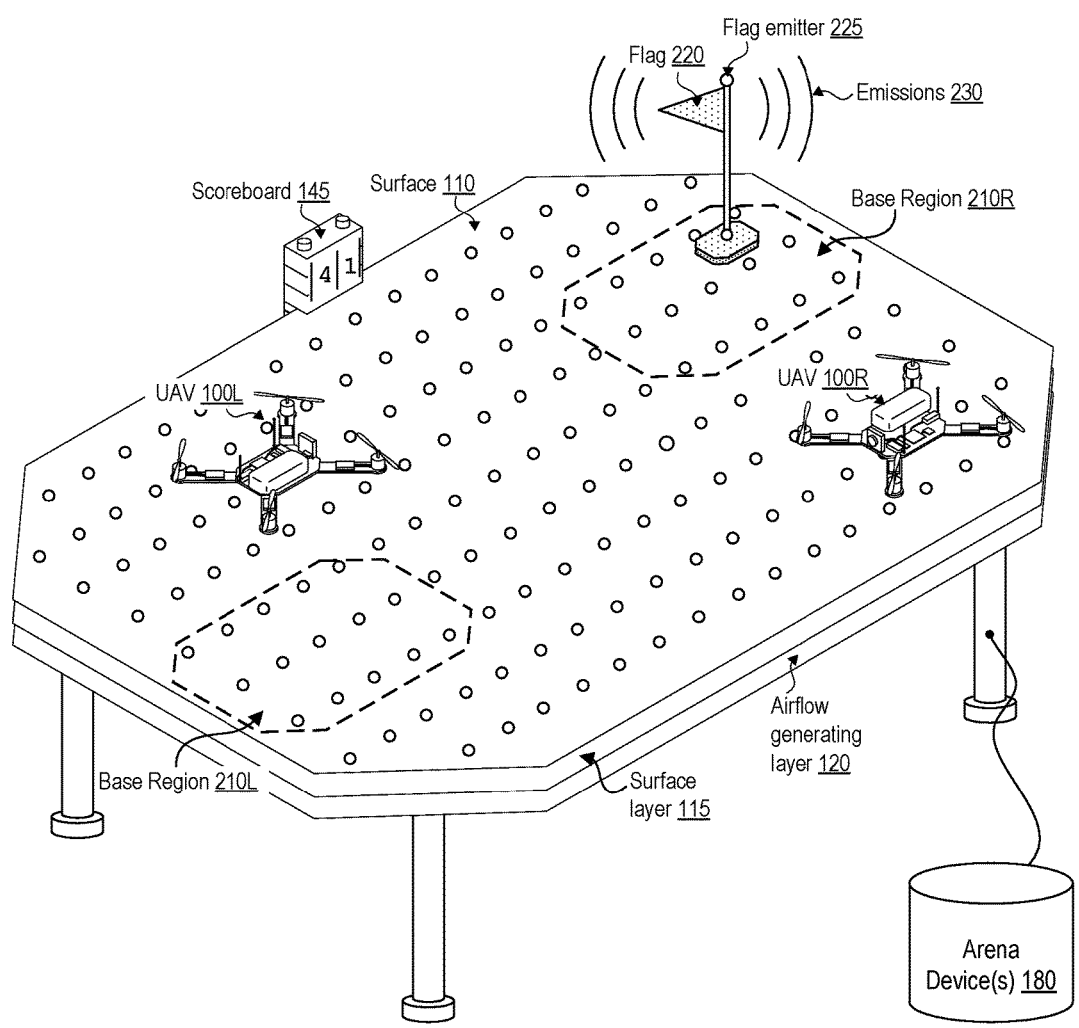
FIG. 2 illustrates a perspective view of an arena system with two unmanned aerial vehicles (UAVs), two base regions, a flag, and a scoreboard.

FIG. 2 illustrates a perspective view of an arena system with two unmanned aerial vehicles (UAVs), two base regions, a flag, and a scoreboard.

The arena system of FIG. 2 is arranged for a "capture the flag" style of game. The arena system of FIG. 2 includes a left base region 210L and a right base region 210R. The arena system of FIG. 2 also includes flag 220, which may include a flag emitter 225 that may be any type of wireless emitter discussed with respect to FIG. 1C. This may be used to detect when the flag 220 is in a particular base region 210, and to send a signal to the scoreboard 145 to increment the score associated with the appropriate UAV 100.

For example, the left UAV 100L may gain a point by getting the flag 220 to the left base region 210L and/or by keeping the flag 220 there for a predetermined period of time. The right UAV 100R may gain a point by getting the flag 220 to the right base region 210R and/or by keeping the flag 220 there for a predetermined period of time. UAVs 100 could score points by stealing the flag 220 from each other as well.

The UAVs 100 may "see" the flag 220 even when it is not in the field of view of their camera by using onboard receivers corresponding to the wireless emitter in the flag emitter 225 to sense the emissions 230 and use those to detect the location of the flag 220, for example by gauging when the signal gets stronger as the UAV 100 and/or flag 220 moves.

The UAVs 100 may move the flag by grabbing it with a motorized or spring-loaded claw, or grab the flag 220 magnetically, or may move the flag 220 by pushing it via the body of the UAV 100 or pulling it via a hook or claw or loop or lasso mounted on the UAV 100.

The base regions 210 may be marked on the surface 110, for example by being printed on the surface 110, by being taped onto the surface 110 by a human user, by being projected onto the surface 110 via a projector (not shown), or by being displayed on the surface 110 in an embodiment wherein the surface 110 includes a display system 1170. The base regions 210 may also include wireless emitters so that the UAVs 100 know where they are even the base regions 210 are not in the field of view of the camera of the UAV 100.

Sensors on the flag 220, along the surface 110, onboard either UAV 100, or some combination thereof may be used to detect when the flag 220 has entered or exited a base region 210. The sensors may be any of the types of sensors discussed in relation to FIG. 1C. Each base region 210 may have sensors. The sensors may also be located away from the surface 110, such as overhead or off to the side, by being mounted on a wall or ceiling or on another UAV 100 that serves as a "referee."

Figure 3:
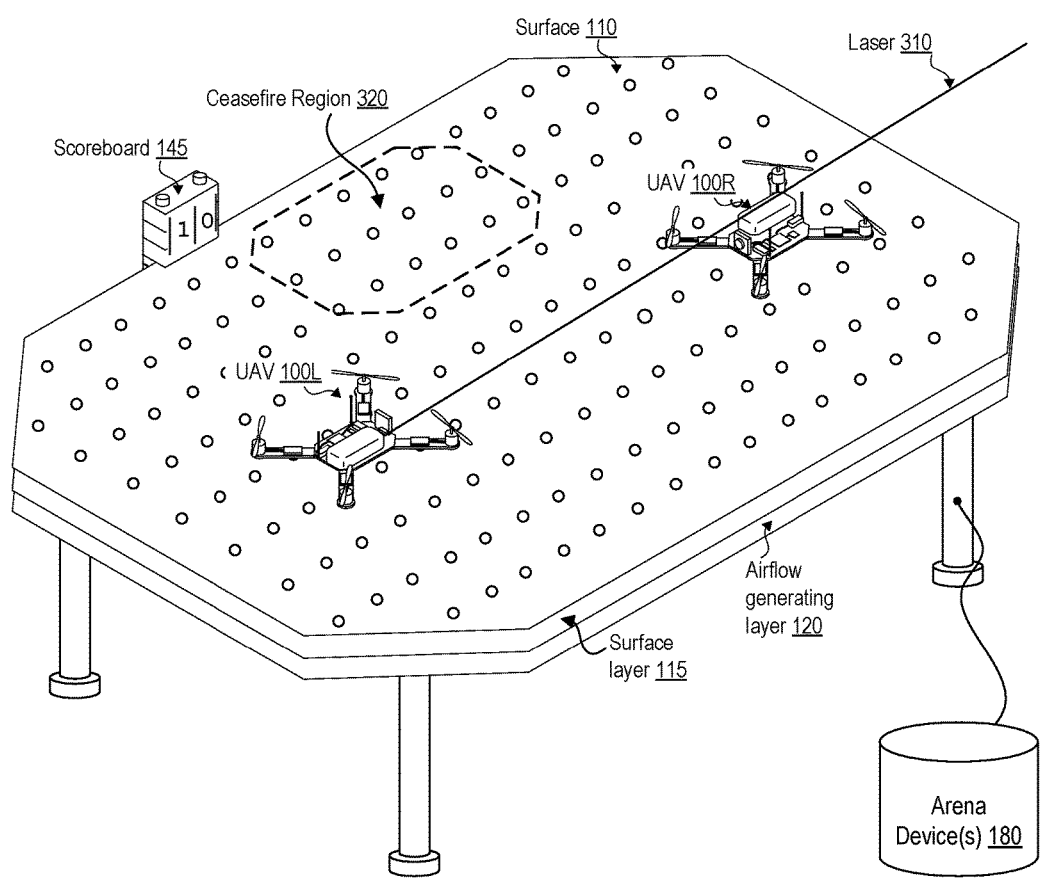
FIG. 3 illustrates a perspective view of an arena system with two unmanned aerial vehicles (UAVs) equipped with laser emitters and light detectors, a ceasefire region, and a scoreboard.

FIG. 3 illustrates a perspective view of an arena system with two unmanned aerial vehicles (UAVs) equipped with laser emitters and light detectors, a ceasefire region, and a scoreboard.

The arena system of FIG. 3 is arranged for a "laser tag" style game. The UAVs 100 of FIG. 3 include laser emitters and light sensors. The laser emitters are configured to emit a laser 310. The light sensor onboard each UAV 100 is configured to detect when the UAV 100 is "hit" or "tagged" by a laser 310. When a UAV 100 detects that it is hit, it may send an update to the scoreboard 145 to detract a point from its own score and/or to increase the score of the UAV 100 that hit it. In situations where multiple UAVs 100 are playing laser tag, the arena device 180 may receive signals from all of the UAVs 100 whenever each UAVs 100 fires a laser 310 and/or is hit by a laser 310, and may determine which UAV 100 fires a particular laser 310 that hit a particular target UAV 100 based on laser firing time and laser hit time as reported by the UAVs 100, as well by locations and/or directional headings as reported the UAVs 100.

The arena system of FIG. 3 includes a ceasefire region 320, whose boundaries may be identified as described regarding the base regions 210 of FIG. 2. A UAV 100 in the ceasefire region 320 may have its laser emitter disabled and/or may have its light sensor disabled.

Figure 4A:
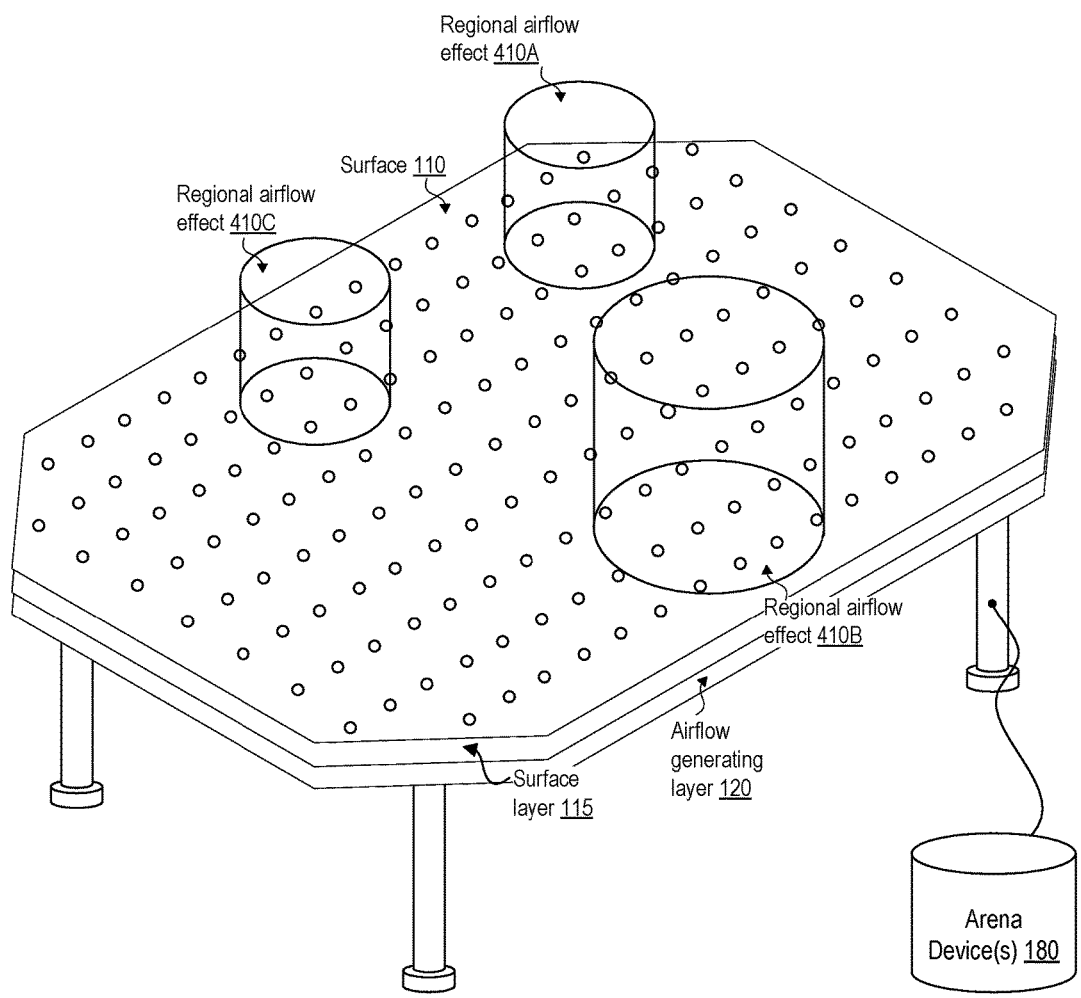
FIG. 4A illustrates a perspective view of an arena system with multiple regional airflow effects.
Figure 4B:
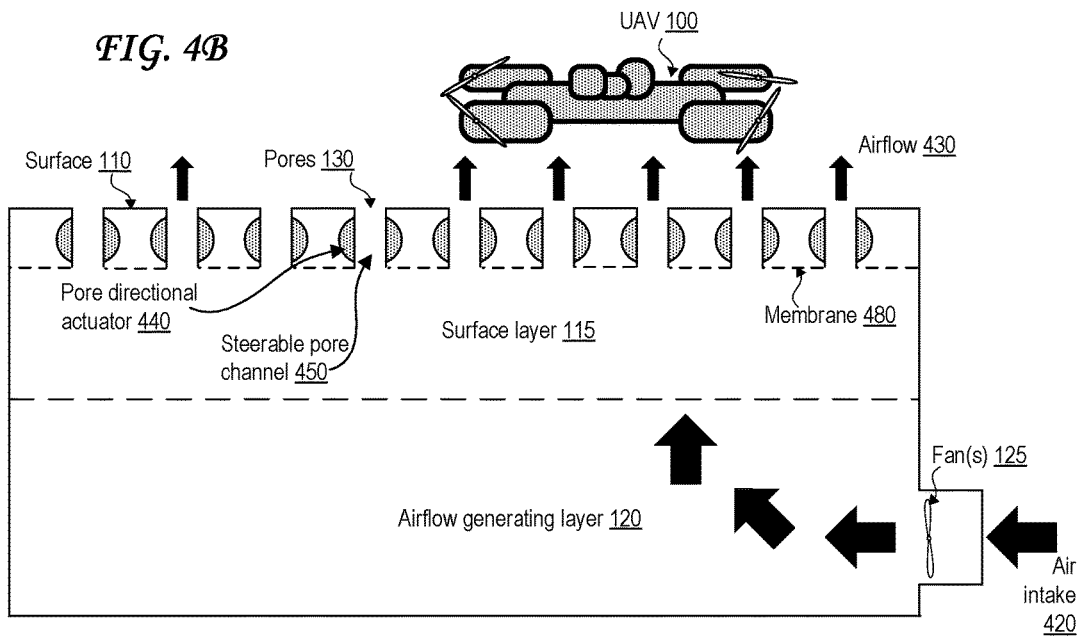
FIG. 4B illustrates a side view of an arena system with pore directional actuators.

FIG. 4A illustrates a perspective view of an arena system with multiple regional airflow effects.

The arena system of FIG. 4A illustrates three (3) regional airflow effects along 410 different regions of the surface 110. These airflow effects are identified in FIG. 4A as regional airflow effect 410A, regional airflow effect 410B, and regional airflow effect 410C, respectively. The different regional airflow effects 410 are illustrated as affecting cylindrical volumes of different radii, but they may affect differently shaped volumes as well, such as spherical volumes, ovoid volumes, or some combination of spherical, ovoid, and cylindrical volumes. The regional airflow effects 410 may include, for example, regions with stronger-than-usual lift, weaker-than-usual lift, no lift, maximum lift, a "wind" that supplies thrust in a particular direction, a tornado-style vortex, or some combination thereof.

Regional airflow effects 410 may be controlled by the arena device 180, by the control transmitter 800, or some combination thereof. The regional airflow effects 410 and may more specifically be produced when the airflow generating layer 120 includes multiple fans 125, and in particular, when different fans 125 are coaxed to produce different strengths and/or directions of airflow compared to the remainder of the fans 125 or just to neighboring fans 125. For example, one fan 125 can be spun faster than its neighboring fans 125, producing increased lift 1010 over the region of the surface 110 affected by the faster fan 125 compared to the regions of the surface 110 affected by the slower neighboring fans 125. Alternately, different regional airflow effects 410 may be produced via regional control of pore directional actuators 440

Each UAV 100 may be made aware of locations with regional airflow effects 410 by receiving signals identifying locations of regional airflow effects 410 from the arena device 180, or by receiving emissions 230 from wireless emitters located along the surface 110 that emit at locations where regional airflow effects 410 are present. Alternately, a projector may project an image or video on to the surface 110 indicating a regional airflow effect 410; this may then be recognized by the UAV 100 via image recognition.

FIG. 4B illustrates a side view of an arena system with pore directional actuators.

The arena system of FIG. 4B is similar to the one illustrated in FIG. 1B in that it includes a single fan 125, in this case drawing air from an air intake 420 located at a "side of the table" surface of the arena system rather than a "bottom of the table" surface of the arena system as in FIG. 1B.

The fan 125 of FIG. 4B generates airflow that is directed upward from the airflow generating layer 120 to the surface layer 115. The airflow can be directed to the surface layer via additional fans 125 (not pictured), tubes (not pictured), or natural airflow within one or more internal chamber(s) of the arena system.

Airflow 430 is ultimately output via the pores 130 of the surface layer 115, producing lift 1010 (and optionally thrust 1020) for the UAV 100 as illustrated in FIG. 10A. The airflow 430 can be directed out of the pores 130 at an angle perpendicular to the surface 110, or can be directed out of the pores 130 at a different angle, as controlled by the pore directional actuator 440.

Figure 4C:
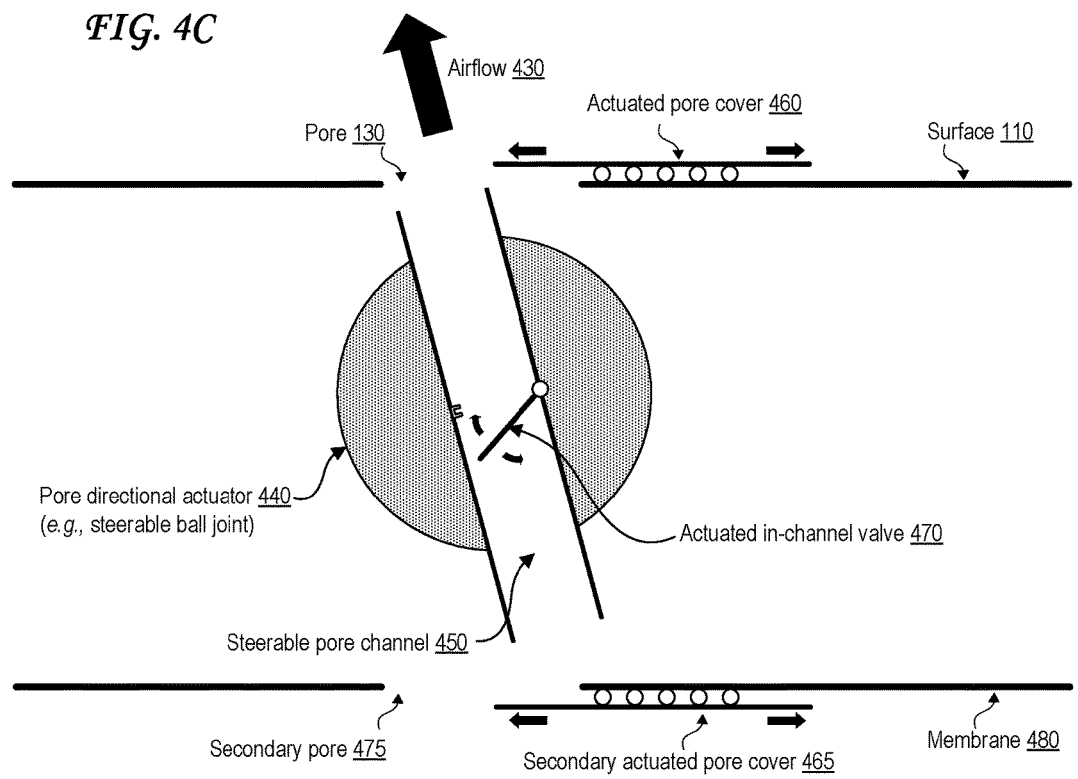
FIG. 4C illustrates a close-up side view of a pore directional actuator.

FIG. 4C illustrates a close-up side view of a pore directional actuator. The pore directional actuator 440 of FIG. 4C is a steerable ball joint controlling a steerable pore channel 450, which directs the angle at which the airflow 430 comes out of the pore 130 of FIG. 4C. In other cases, the pore directional actuator 440 may use a lever, hinge, or pulley joint instead of a ball joint. This angle can be anywhere between 45 degrees with respect to the surface 110 to 90 degrees with respect to the surface 110 (perpendicular to the surface 110). Each pore directional actuator 440 may be controlled by the arena device 180, by a controller transmitter 800, or some combination thereof. All of the pore directional actuators 440 of an arena system can be controlled simultaneously to produce uniform airflow across the area above the arena system. Alternately, one or more pore directional actuators 440 may be controlled individually to produce various regional airflow effects 410 as illustrated in FIG. 4A.

In some cases, the output angle of the airflow 430 may be limited using mechanical or software constraints on the pore directional actuator 440, such as between 65 degrees and 90 degrees, between 70 degrees and 90 degrees, between 75 degrees and 90 degrees, between or between 80 degrees and 90 degrees, or between 85 degrees and 90 degrees with respect to the surface 110. In other cases, an additional wider range of output angles for the airflow 430 may be allowed, such as between 45 degrees and 35 degrees, between 45 degrees and 30 degrees, between 45 degrees and 25 degrees, between 45 degrees and 20 degrees, between 45 degrees and 15 degrees, between 45 degrees and 10 degrees, between 45 degrees and 5 degrees, or between 45 degrees and 0 degrees with respect to the surface 110.

An actuated pore cover 460 is also illustrated in FIG. 4C. The actuated pore cover 460 regulates and/or restricts as to how much (if any) airflow 430 is allowed to escape through the pore 130 of the surface 110 via occlusion of at least some of the pore 130. The actuated pore cover 460 is illustrated in FIG. 4C as moving via an actuated sliding door system, but may alternately be moved via one or more actuated hinges, one or more actuated pulleys, or one or more actuated blinds similar to window blinds. Through partial closure of the actuated pore cover 460, causing partial occlusion of the pore 130, the actuated pore cover 460 can also optionally modify an angle at which the airflow 430 is output through the pore 130 of the surface 110, especially if the actuated pore cover 460 uses actuated hinges or blinds. Each actuated pore cover 460 may be controlled by the arena device 180, by a controller transmitter 800, or some combination thereof. All of the actuated pore covers 460 of an arena system can be controlled simultaneously to produce uniform airflow across the area above the arena system. Alternately, one or more actuated pore cover 460 may be controlled individually to produce various regional airflow effects 410 as illustrated in FIG. 4A.

A membrane 480 may optionally be positioned parallel to the surface 110 but along the opposite opening of the steerable pore channel 450 as the surface 110 is positioned along. The membrane 480 may include a secondary pore 475 and a secondary actuated pore cover 465, which may be actuated in any of the ways discussed concerning the actuated pore cover 460 and may regulate and/or restrict as to how much (if any) airflow 430 is allowed enter the secondary pore 475 in the membrane 480 and/or to escape through the pore 130 via occlusion of at least some of the secondary pore 475. Through partial closure of the secondary actuated pore cover 465, causing partial occlusion of the secondary pore 475, the secondary actuated pore cover 465 can also optionally modify an angle at which the airflow 430 is output through the pore 130 of the surface 110, especially if the secondary actuated pore cover 465 uses actuated hinges or blinds.

The actuated pore cover 460 and/or secondary actuated pore cover 465 can be replaced by or supplemented with one or more actuated in-channel valves 470 also illustrated in FIG. 4C. An actuated in-channel valve 470 lies either within the steerable pore channel 450 or at either end of the steerable pore channel 450, and like the actuated pore cover 460, can be used to regulate how much (if any) airflow 430 is allowed to pass through the steerable pore channel 450 and escape through the pore 130 of the surface 110 via occlusion of at least some of the steerable pore channel 450. The actuated in-channel valve 470 of FIG. 4C is illustrated as being movable using an actuated hinge, but it can alternately be movable using an actuated sliding door system, one or more actuated pulleys, or one or more actuated blinds similar to window blinds. Through partial closure of the actuated in-channel valve 470, causing partial occlusion of the steerable pore channel 450, the in-channel valve 470 can also optionally modify an angle at which the airflow 430 is output through the pore 130 of the surface 110, especially if the in-channel valve 470 uses actuated hinges or blinds.

While the pore channel 450 is labelled as "steerable" in FIG. 4C and is referred to herein as such, it should be understood that the pore channel 450 may in some cases be static, in which case the pore directional actuator 440 may be missing, disabled, or depowered. The existence of the membrane 480, the actuated pore cover 460, secondary actuated pore cover 465, and/or the actuated in-channel valve 470 is not dependent the pore channel 450 being steerable via actuator 440 or otherwise. The actuated pore cover 460 and secondary actuated pore cover 465 may in some cases be referred to herein as valves. Any combination of the components illustrated in or described with respect to FIG. 1A, FIG. 1B, FIG. 4A, FIG. 4B, and/or FIG. 4C can be used to help direct and control airflow 430 locally at regions of the surface 110 and/or globally above the surface 110 as a whole.

The various techniques of redirection or restriction of airflow 430 through a particular pore 130 of the surface 110 as pictured in FIG. 4C are not limited to being used for a single pore at a time. A region of neighboring pores 130 along the surface 110 can simultaneously modify or restrict airflow in the same manner to create a regional airflow effect 410 as discussed with respect to FIG. 4A. In some cases, a region under a UAV 100 can be specifically steered to control lift 1010 and/or thrust 1020 affecting the UAV 100 at any given time, either by a person through an interface or autonomously by the UAV 100 and/or the arena device(s) 180, or some combination thereof.

The actuated mechanisms illustrated and discussed with regard to FIG. 4C can be actuated autonomously, actuated automatically in response to an input, or manually steered in response to an input. That is, the actuated mechanisms can be actuated in response to receipt of a signal from a user control interface, in response to receipt of a signal from a UAV 100, in response to receipt of a signal from the arena device(s) 180, or some combination thereof. The actuated mechanisms can be actuated to create regional airflow effects 410, to help steer and/or lift a UAV 100, to compensate for undesirable airflow effects such as vortices within the airflow generating layer 120 and/or external to it, to correct an error or defect in a fan 125 or pore 130 or channel 450, or some combination thereof.

Use of airflow output through the pores of the porous surface 110 can reduce energy usage by the UAV 100 and allow its battery/fuel to last longer, as the UAV 100 need not expend energy to generate lift or even thrust in cases where the airflows generate/affect thrust. In some cases, however, the UAV 100 may include fans as well, for greater precision, control, and responsiveness.

FIG. 4D illustrates an exploded view of an arena system with an array of electromagnets, two unmanned aerial vehicles (UAVs), and two goals.

The arena system of FIG. 4D is similar to the one illustrated in FIG. 1A, but includes an array of active electromagnets 495 in a magnetic field generating layer 490.

In some cases, the UAV 100 can receive lift and/or thrust from passive magnetic propulsion, active magnetic propulsion, or some combination thereof, either to replace or to supplement the airflow-based system discussed with respect to the FIG. 1A through FIG. 4C. That is, the UAV 100 can contain one or more permanent magnets, and the surface 110 can include an array of active electromagnets 495 in a magnetic field generating layer 490 that can push or pull against the passive permanent magnet(s) in the UAV 100 to generate lift and thrust. The magnetic field produced by each electromagnet 495 of the array can be controlled, as can movement and tilting of each electromagnet 495 of the array, for example using a hinge or a steerable ball joint as in FIG. 4C.

The movement/tilt of each electromagnet 495 of the array, and magnetic field produced by each electromagnet 495 of the array can be controlled all together, separately, or in groups. Movement, tilt, and magnetic field strength of the electromagnets 495 can be actuated autonomously, actuated automatically in response to an input, or manually steered in response to an input. That is, movement, tilt, and magnetic field strength of the electromagnets 495 can be actuated in response to receipt of a signal from a user control interface, in response to receipt of a signal from a UAV 100, in response to receipt of a signal from the arena device(s) 180, or some combination thereof. Movement, tilt, and magnetic field strength of the electromagnets 495 can be actuated or controlled to create regional magnetic field effects similar to the regional airflow effects 410 of FIG. 4A, to help steer and/or propel and/or lift a UAV 100, to compensate for undesirable magnetic field effects such as interference with another UAV 100 or device, to correct or compensate for an error or defect in an electromagnet 495, or some combination thereof.

The magnetic field generating layer 490 replaces the airflow generating layer 120 in the arena system illustrated in FIG. 4D, where the array of electromagnets 495 replaces the fan(s) 125 and airflow system. In some cases, the array of electromagnets 495 supplements fan(s) 125 in an airflow system such as those illustrated in FIG. 1A, FIG. 1B, FIG. 4A, FIG. 4B, or FIG. 4C. In such a case, the airflow generating layer 120 can be merged with the magnetic field generating layer 490 so that the fan(s) 125 and electromagnet(s) 495 are in the same layer/chamber/volume. The airflow generating layer 120 can alternatively be kept separate and instead stacked atop each other, so that the magnetic field generating layer 490 is stacked atop the airflow generating layer 120 or the airflow generating layer 120 is stacked atop the magnetic field generating layer 490.

Use of permanent magnet(s) in the UAV 100 can reduce energy usage by the UAV 100 and allow its battery to last longer, as it need not expend energy to generate lift or even thrust in cases where the array of active electromagnets 495 generates/affects thrust. In some cases, however, the UAV 100 may include electromagnets as well, for greater precision, control, and responsiveness. The array of electromagnets 495 of FIG. 4D can also in some cases be replaced with a single large electromagnet, an array of permanent magnets, or a single permanent magnet.

Permanent magnets can be "rare earth" magnets such as neodymium magnets or samarium-cobalt magnets. Permanent magnets can be ferrite magnets, alnico magnets, or magnetized ferromagnetic materials such as metals or ceramics. Permanent magnets may include iron, nickel, cobalt, or alloys/materials including any combination of these.

Figure 5A:
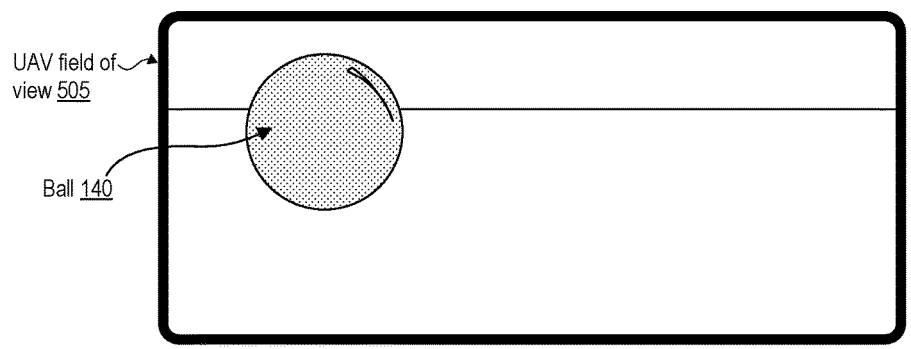
FIG. 5A illustrates a field of view of an unmanned aerial vehicle (UAV) during a game involving a ball.

FIG. 5A illustrates a field of view of an unmanned aerial vehicle (UAV) during a game involving a ball.

The UAV field of view 505 of FIG. 5A illustrates a view from the camera 705 of the UAV 100. A ball 140 and a perimeter of the surface 110 is visible in the UAV field of view 505. The camera 705 may capture the UAV field of view 505 as an image or video, and may transmit this as a camera feed to the display 900, where the user may view the UAV field of view 505. The camera feed may be transmitted in real-time or with a delay for processing or otherwise.

The camera feed may be transmitted directly from the UAV 100 to the display 900, or indirectly through the arena device 180 or control transmitter 800. The camera feed may be modified before it is displayed at the display 900 to portray an augmented reality view as illustrated in FIG. 5B.

The modifications to the camera view may be made by a computing device 1100 onboard the UAV 100, by a computing device 1100 onboard the display 900, by a computing device 1100 onboard the control transmitter 800, by the arena device 180, by a separate computing device 1100 communicatively coupled to any of these devices, or some combination thereof. The modifications to the camera view may involve various computer vision techniques implemented via hardware, software, or some combination thereof. These computer vision techniques may include edge detection, tracking, pattern recognition, character recognition, 3D segmentation, 3D modeling, counting, quantification, machine learning, face detection, logo detection, optical character recognition, barcode scanning, quick response (QR) code scanning, or some combination thereof.

The camera feed may include data from multiple cameras to provide depth perception and identify distances between the UAV 100 and objects in the UAV field of view 505. The camera feed may include data from a distance measurement system, such as a laser rangefinder, a radar device, a sonar device, or a lidar device, to provide depth perception and identify distances between the UAV 100 and objects in the UAV field of view 505. Image recognition and tracking may be based on one or more shapes, one or more colors, one or more brightness levels, one or more contrast levels, a relative size, an absolute size, one or more facial features, one or more logos, one or more barcodes, one or more QR codes, one or more reference points, or some combination thereof.

Figure 5B:
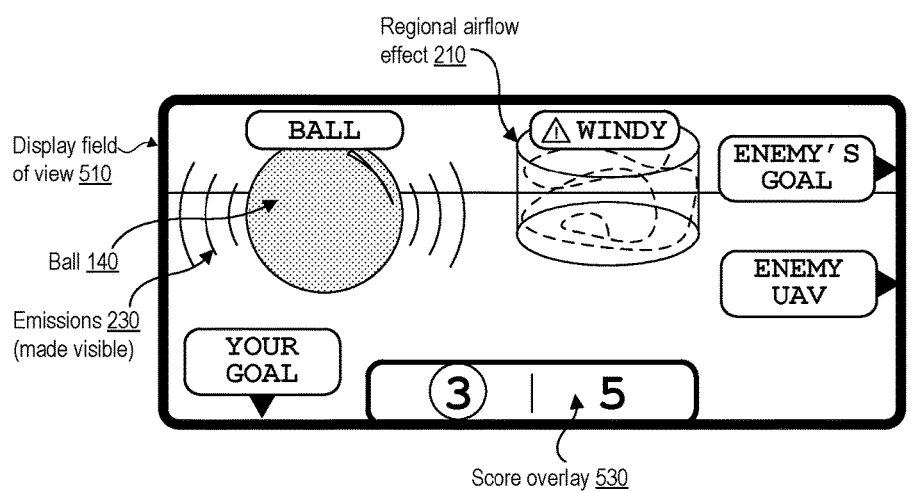
FIG. 5B illustrates an augmented-reality-based field of view of a display in communication with an unmanned aerial vehicle (UAV) during a game involving a ball.

FIG. 5B illustrates an augmented-reality-based field of view of a display in communication with an unmanned aerial vehicle (UAV) during a game involving a ball.

The display field of view 510 of FIG. 5B illustrates an augmented reality view from the display 900 to which the camera feed from the UAV 100 is transmitted after modification. The display field of view 510 of FIG. 5B includes labels identifying the ball and a regional airflow effect 210. The display field of view 510 of FIG. 5B also illustrates the emissions 230 from the ball 140, indicating that the ball 140 includes a wireless emitter detectable by the UAV 100, and making the ball 140 more visible to the user of the display 900 even if the ball 140 moves out of the UAV field of view 505. The display field of view 510 of FIG. 5B also illustrates a score overlay 530 identifying the score on the scoreboard 145 as well as labels for objects not in the UAV field of view 505, including the enemy's goal 105, the enemy UAV 100, and the user's goal 105.

Figure 6A:
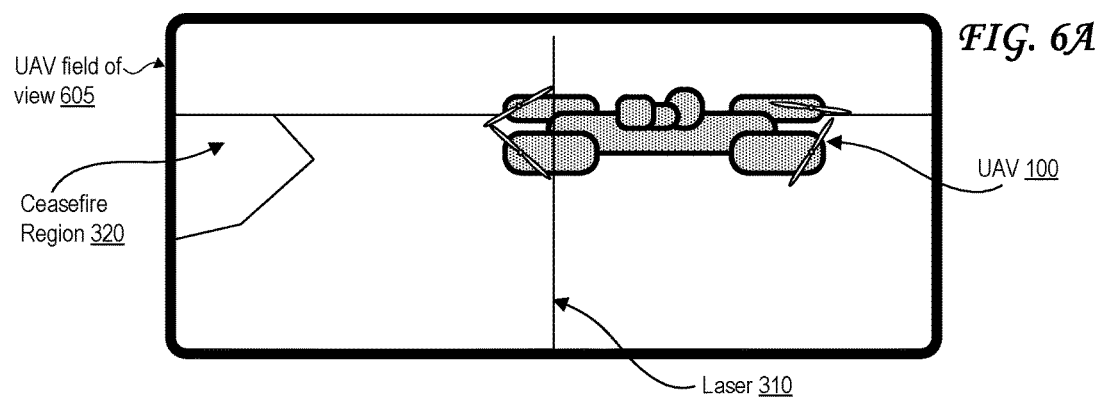
FIG. 6A illustrates a field of view of an unmanned aerial vehicle (UAV) during a game involving laser emission.

FIG. 6A illustrates a field of view of an unmanned aerial vehicle (UAV) during a game involving laser emission.

The UAV field of view 605 of FIG. 6A illustrates a laser 310 that is emitted by a laser emitter of the UAV 100 capturing the UAV field of view 605. The UAV field of view 605 of FIG. 6A also illustrates a second "enemy" UAV 100 that is "hit" or "tagged" by the laser 310. The UAV field of view 605 of FIG. 6A also illustrates a perimeter of the surface 110 and markings on the surface 110 indicating a ceasefire region 320.

Figure 6B:
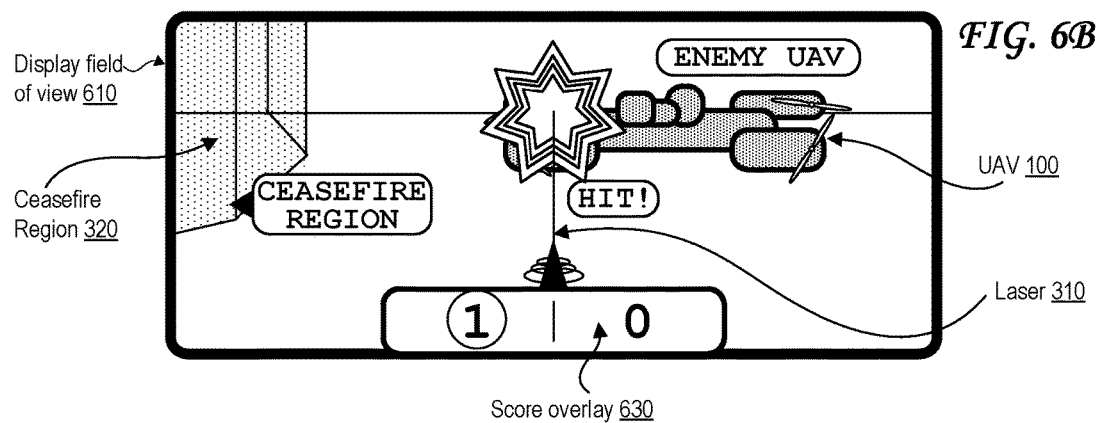
FIG. 6B illustrates an augmented-reality-based field of view of a display in communication with an unmanned aerial vehicle (UAV) during a game involving laser emission.

FIG. 6B illustrates an augmented-reality-based field of view of a display in communication with an unmanned aerial vehicle (UAV) during a game involving laser emission.

The display field of view 610 illustrates a modified augmented reality variant of the UAV field of view 605 of FIG. 6A. The display field of view 610 includes a score overlay 630. The display field of view 610 illustrates an "explosion" effect indicating that the enemy UAV 100 has been "hit" or "tagged" by the laser 310. The display field of view 610 illustrates the ceasefire region 320 as a three-dimension volume by extending it upwards from the markings on the surface 100 of the UAV field of view 605. The display field of view 610 illustrates labels identifying the enemy UAV 100, the ceasefire region, and the hit by the laser 310.

Figure 7A:
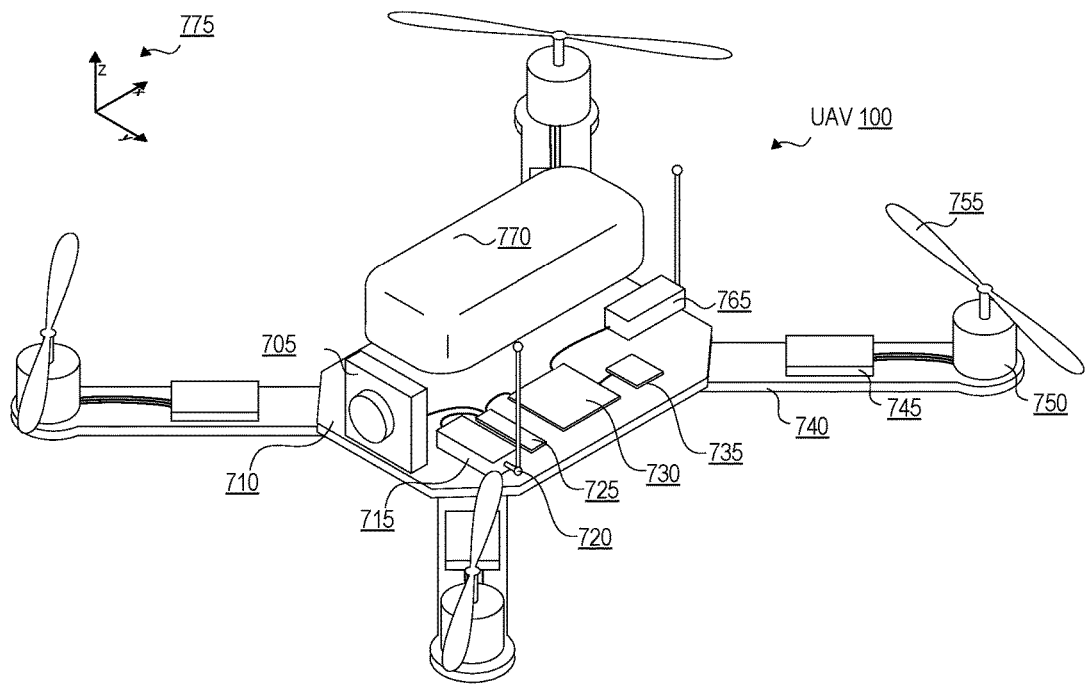
FIG. 7A illustrates a first embodiment of an unmanned aerial vehicle (UAV).

FIG. 7A shows unmanned aerial vehicle (UAV) 100 according to a first embodiment. UAV 100 can have one or more motors 750 configured to rotate attached propellers 755 in order to control the position of UAV 100 in the air. UAV 100 can be configured as a fixed wing vehicle (e.g., airplane), a rotary vehicle (e.g., a helicopter or multirotor), or a blend of the two. For the purpose of FIG. 7, axes 775 can assist in the description of certain features. If UAV 100 is oriented parallel to the ground, the Z axis can be the axis perpendicular to the ground, the X axis can generally be the axis that passes through the bow and stern of UAV 100, and the Y axis can be the axis that pass through the port and starboard sides of UAV 100. Axes 775 are merely provided for convenience of the description herein.

In some embodiments, UAV 100 has main body 710 with one or more arms 740. The proximal end of arm 740 can attach to main body 710 while the distal end of arm 740 can secure motor 750. Arms 740 can be secured to main body 710 in an "X" configuration, an "H" configuration, a "T" configuration, a "Y" configuration, or any other configuration as appropriate. The number of motors 750 can vary, for example there can be three motors 750 (e.g., a "tricopter"), four motors 750 (e.g., a "quadcopter"), eight motors (e.g., an "octocopter"), etc.

In some embodiments, each motor 755 rotates (i.e., the drive shaft of motor 755 spins) about parallel axes. For example, the thrust provided by all propellers 755 can be in the Z direction. Alternatively, a motor 755 can rotate about an axis that is perpendicular (or any angle that is not parallel) to the axis of rotation of another motor 755. For example, two motors 755 can be oriented to provide thrust in the Z direction (e.g., to be used in takeoff and landing) while two motors 755 can be oriented to provide thrust in the X direction (e.g., for normal flight). In some embodiments, UAV 100 can dynamically adjust the orientation of one or more of its motors 750 for vectored thrust.

In some embodiments, the rotation of motors 750 can be configured to create or minimize gyroscopic forces. For example, if there are an even number of motors 750, then half of the motors can be configured to rotate counter-clockwise while the other half can be configured to rotate clockwise. Alternating the placement of clockwise and counter-clockwise motors can increase stability and enable UAV 100 to rotate about the z-axis by providing more power to one set of motors 750 (e.g., those that rotate clockwise) while providing less power to the remaining motors (e.g., those that rotate counter-clockwise).

Motors 750 can be any combination of electric motors, internal combustion engines, turbines, rockets, etc. In some embodiments, a single motor 750 can drive multiple thrust components (e.g., propellers 755) on different parts of UAV 100 using chains, cables, gear assemblies, hydraulics, tubing (e.g., to guide an exhaust stream used for thrust), etc. to transfer the power.

In some embodiments, motor 750 is a brushless motor and can be connected to electronic speed controller X45. Electronic speed controller 745 can determine the orientation of magnets attached to a drive shaft within motor 750 and, based on the orientation, power electromagnets within motor 750. For example, electronic speed controller 745 can have three wires connected to motor 750, and electronic speed controller 745 can provide three phases of power to the electromagnets to spin the drive shaft in motor 750. Electronic speed controller 745 can determine the orientation of the drive shaft based on back-end on the wires or by directly sensing to position of the drive shaft.

Transceiver 765 can receive control signals from a control unit (e.g., a handheld control transmitter, a server, etc.). Transceiver 765 can receive the control signals directly from the control unit or through a network (e.g., a satellite, cellular, mesh, etc.). The control signals can be encrypted. In some embodiments, the control signals include multiple channels of data (e.g., "pitch," "yaw," "roll," "throttle," and auxiliary channels). The channels can be encoded using pulse-width-modulation or can be digital signals. In some embodiments, the control signals are received over TC/IP or similar networking stack.

In some embodiments, transceiver 765 can also transmit data to a control unit. Transceiver 765 can communicate with the control unit using lasers, light, ultrasonic, infra-red, Bluetooth, 802.11x, or similar communication methods, including a combination of methods. Transceiver can communicate with multiple control units at a time.

Position sensor 735 can include an inertial measurement unit for determining the acceleration and/or the angular rate of UAV 100, a GPS receiver for determining the geolocation and altitude of UAV 100, a magnetometer for determining the surrounding magnetic fields of UAV 100 (for informing the heading and orientation of UAV 100), a barometer for determining the altitude of UAV 100, etc. Position sensor 735 can include a land-speed sensor, an air-speed sensor, a celestial navigation sensor, etc.

UAV 100 can have one or more environmental awareness sensors. These sensors can use sonar, LiDAR, stereoscopic imaging, computer vision, etc. to detect obstacles and determine the nearby environment. For example, a collision avoidance system can use environmental awareness sensors to determine how far away an obstacle is and, if necessary, change course.

Position sensor 735 and environmental awareness sensors can all be one unit or a collection of units. In some embodiments, some features of position sensor 735 and/or the environmental awareness sensors are embedded within flight controller 730.

In some embodiments, an environmental awareness system can take inputs from position sensors 735, environmental awareness sensors, databases (e.g., a predefined mapping of a region) to determine the location of UAV 100, obstacles, and pathways. In some embodiments, this environmental awareness system is located entirely on UAV 100, alternatively, some data processing can be performed external to UAV 100.

Camera 705 can include an image sensor (e.g., a CCD sensor, a CMOS sensor, etc.), a lens system, a processor, etc.

The lens system can include multiple movable lenses that can be adjusted to manipulate the focal length and/or field of view (i.e., zoom) of the lens system. In some embodiments, camera 705 is part of a camera system which includes multiple cameras 705. For example, two cameras 705 can be used for stereoscopic imaging (e.g., for first person video, augmented reality, etc.). Another example includes one camera 705 that is optimized for detecting hue and saturation information and a second camera 705 that is optimized for detecting intensity information. In some embodiments, camera 705 optimized for low latency is used for control systems while a camera 705 optimized for quality is used for recording a video (e.g., a cinematic video). Camera 705 can be a visual light camera, an infrared camera, a depth camera, etc.

A gimbal and dampeners can help stabilize camera 705 and remove erratic rotations and translations of UAV 100. For example, a three-axis gimbal can have three stepper motors that are positioned based on a gyroscope reading in order to prevent erratic spinning and/or keep camera 705 level with the ground. Alternatively, image stabilization can be performed digitally using a combination of motion flow vectors from image processing and data from inertial sensors such as accelerometers and gyros.

Video processor 725 can process a video signal from camera 705. For example video process 725 can enhance the image of the video signal, down-sample or up-sample the resolution of the video signal, add audio (captured by a microphone) to the video signal, overlay information (e.g., flight data from flight controller 730 and/or position sensor), convert the signal between forms or formats, etc.

Video transmitter 720 can receive a video signal from video processor 725 and transmit it using an attached antenna. The antenna can be a cloverleaf antenna or a linear antenna. In some embodiments, video transmitter 720 uses a different frequency or band than transceiver 765. In some embodiments, video transmitter 720 and transceiver 765 are part of a single transceiver.

Battery 770 can supply power to the components of UAV 100. A battery elimination circuit can convert the voltage from battery 770 to a desired voltage (e.g., convert 12 v from battery 770 to 5 v for flight controller 730). A battery elimination circuit can also filter the power in order to minimize noise in the power lines (e.g., to prevent interference in transceiver 765 and transceiver 720). Electronic speed controller 745 can contain a battery elimination circuit. For example, battery 770 can supply 12 volts to electronic speed controller 745 which can then provide 5 volts to flight controller 730. In some embodiments, a power distribution board can allow each electronic speed controller (and other devices) to connect directly to the battery.

In some embodiments, battery 770 is a multi-cell (e.g., 2S, 3S, 4S, etc.) lithium polymer battery. Battery 770 can also be a lithium-ion, lead-acid, nickel-cadmium, or alkaline battery. Other battery types and variants can be used as known in the art. Additional or alternative to battery 770, other energy sources can be used. For example, UAV 100 can use solar panels, wireless or inductive power transfer, a tethered power cable (e.g., from a ground station or another UAV 100), etc. In some embodiments, the other energy source can be utilized to charge battery 770 while in flight or on the ground.

Battery 770 can be securely mounted to main body 710. Alternatively, battery 770 can have a release mechanism. In some embodiments, battery 770 can be automatically replaced. For example, UAV 100 can land on a docking station and the docking station can automatically remove a discharged battery 770 and insert a charged battery 770. In some embodiments, UAV 100 can pass through docking station and replace battery 770 without stopping.

Battery 770 can include a temperature sensor for overload prevention. For example, when charging, the rate of charge can be thermally limited (the rate will decrease if the temperature exceeds a certain threshold). Similarly, the power delivery at electronic speed controllers 745 can be thermally limited—providing less power when the temperature exceeds a certain threshold. Battery 770 can include a charging and voltage protection circuit to safely charge battery 770 and prevent its voltage from going above or below a certain range.

UAV 100 can include a location transponder. For example, in a racing environment, race officials can track UAV 100 using location transponder. The actual location (e.g., X, Y, and Z) can be tracked using triangulation of the transponder. In some embodiments, gates or sensors in a track can determine if the location transponder has passed by or through the sensor or gate.

Flight controller 730 can communicate with electronic speed controller 745, battery 770, transceiver 765, video processor 725, position sensor 735, and/or any other component of UAV 100. In some embodiments, flight controller 730 can receive various inputs (including historical data) and calculate current flight characteristics. Flight characteristics can include an actual or predicted position, orientation, velocity, angular momentum, acceleration, battery capacity, temperature, etc. of UAV 100. Flight controller 730 can then take the control signals from transceiver 765 and calculate target flight characteristics. For example, target flight characteristics might include "rotate x degrees" or "go to this GPS location". Flight controller 730 can calculate response characteristics of UAV 100. Response characteristics can include how electronic speed controller 745, motor 750, propeller 755, etc. respond, or are expected to respond, to control signals from flight controller 730. Response characteristics can include an expectation for how UAV 100 as a system will respond to control signals from flight controller 730. For example, response characteristics can include a determination that one motor 750 is slightly weaker than other motors.

After calculating current flight characteristics, target flight characteristics, and response characteristics flight controller 730 can calculate optimized control signals to achieve the target flight characteristics. Various control systems can be implemented during these calculations. For example a proportional-integral-derivative (PID) can be used. In some embodiments, an open-loop control system (i.e., one that ignores current flight characteristics) can be used. In some embodiments, some of the functions of flight controller 730 are performed by a system external to UAV 100. For example, current flight characteristics can be sent to a server that returns the optimized control signals. Flight controller 730 can send the optimized control signals to electronic speed controllers 745 to control UAV 100.

In some embodiments, UAV 100 has various outputs that are not part of the flight control system. For example, UAV 100 can have a loudspeaker for communicating with people or other UAVs 100. Similarly, UAV 100 can have a flashlight or laser. The laser can be used to "tag" another UAV 100.

Figure 7B:
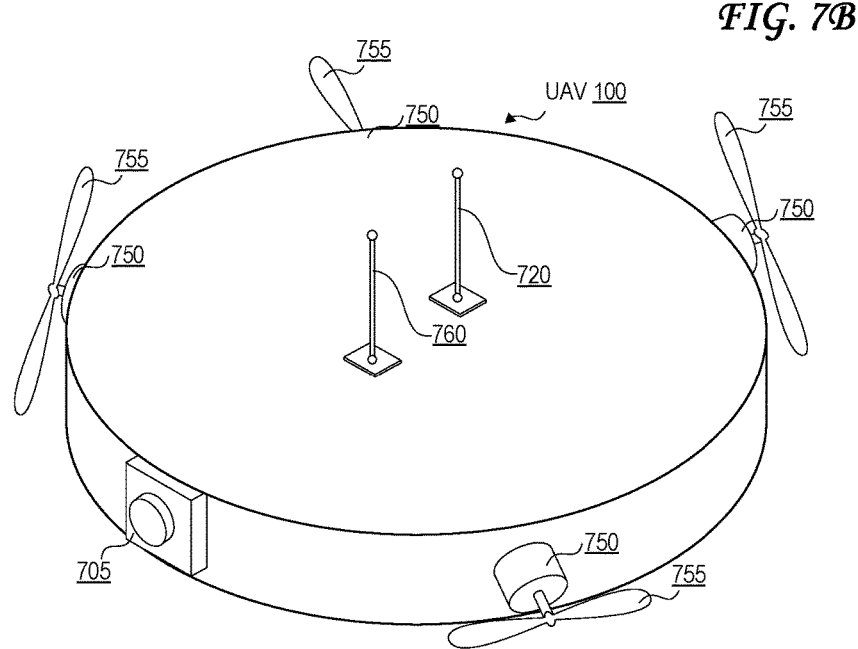
FIG. 7B illustrates a second embodiment of an unmanned aerial vehicle (UAV).

FIG. 7B shows unmanned aerial vehicle (UAV) 100 according to a second embodiment. UAV 100 likewise includes one or more motors 750 configured to rotate attached propellers 755 in order to control the position of UAV 100 in the air. The motorized propellers of the UAV 100 of FIG. 7B, however, are oriented more horizontally and are used primarily or exclusively to provide thrust 1020 rather than lift 1010. Lift 1010 is instead provided by airflow generated by the airflow generating layer 120 and output via the pores of the surface 110. The body of the UAV 100 of FIG. 7B is more disc-shaped so that a larger percentage of the surface area of the UAV 100 encounters the airflow, maximizing lift 1010. The motorized propellers of the UAV 100 may be reversibly driven as well for greater movement control.

Though not all of the UAV components illustrated in FIG. 7A are illustrated in FIG. 7B, it should be understood that the UAV 100 of FIG. 7B may include any of the components that are illustrated in FIG. 7A or discussed elsewhere herein. Some of those may be hidden within the housing/body of the UAV 100 of FIG. 7B, or some may be placed over the body/housing in a manner more similar to the UAV 100 of FIG. 7A. For example, the UAV 100 of FIG. 7B is illustrated with a top housing protecting its components—however, the an alternate embodiment (not pictured), the UAV 100 of FIG. 7B may have a complete disc only at its bottom, and at least some of the components of the UAV 100 of FIG. 7B may be more exposed from above and/or from the sides (e.g., in a manner similar to FIG. 7A) in order to make the UAV 100 lighter.

While this disc-shaped embodiment of the UAV 100 is only illustrated in FIG. 1D and FIG. 7B, it should be understood that it may be used anywhere else that the UAV 100 of FIG. 7A is illustrated, such as in the context of FIG. 2, FIG. 3, FIG. 4A, FIG. 4B, FIG. 6A, FIG. 6B, and FIG. 10A.

While the disc-shaped embodiment of the UAV 100 is illustrated with four (4) motorized propellers, it may only have one motorized propeller, particularly if the motorized propeller can be reversibly driven. On the other hand, the UAV 100 may have more than four (4) motorized propellers as well, for additional maneuverability. In yet another embodiment (not pictured), the UAV 100 may have no motorized propellers, but may have both its lift 1010 and its thrust 1020 provided entirely by the airflow generated by the airflow generating layer 120 and output through the pores in the surface 110.

Figure 8:
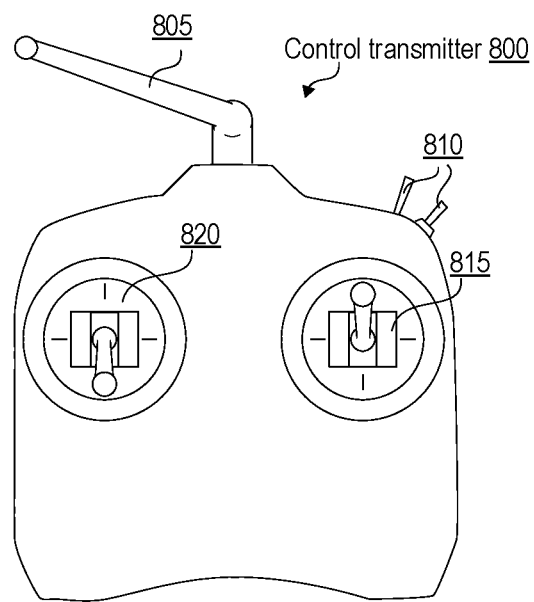
FIG. 8 illustrates a control transmitter for an unmanned aerial vehicle (UAV).

FIG. 8 shows control transmitter 800 according to some embodiments. Control transmitter 800 can send control signals to transceiver 765. Control transmitter can have auxiliary switches 810, joysticks 815 and 820, and antenna 805. Joystick 815 can be configured to send elevator and aileron control signals while joystick 820 can be configured to send throttle and rudder control signals (this is termed a mode 2 configuration). Alternatively, joystick 815 can be configured to send throttle and aileron control signals while joystick 820 can be configured to send elevator and rudder control signals (this is termed a mode 1 configuration). Auxiliary switches 810 can be configured to set options on control transmitter 800 or UAV 100. In some embodiments, control transmitter 800 receives information from a transceiver on UAV 100. For example, it can receive some current flight characteristics from UAV 100.

The control transmitter 800 may control the airflow of the arena system as described herein, in addition to controlling the motorized propellers of the UAV 100. While the control transmitter 800 is illustrated as wireless and separate from the arena system, it should be understood that it may be wired to the arena system, such as by appearing as controls embedded in the raised arena "table" illustrated in FIGS. 1A, 1B, 1C, 2, 3 and 4.

Figure 9:
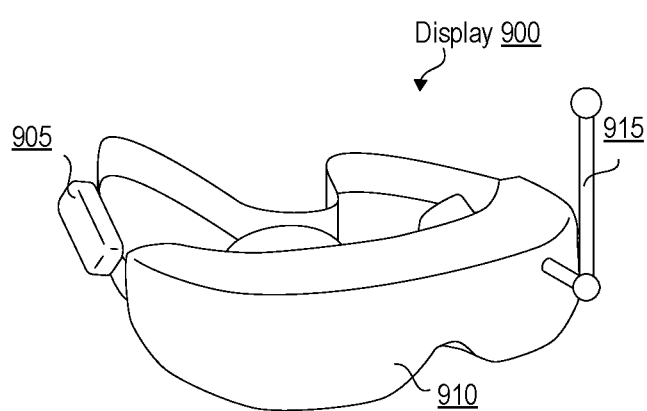
FIG. 9 illustrates a head-mounted display.

FIG. 9 shows display 900 according to some embodiments. Display 900 can include battery 905 or another power source, display screen 910, and receiver 915. Display 900 can receive a video stream from transmitter 720 from UAV 100. Display 900 can be a head-mounted unit as depicted in FIG. 9. Display 900 can be a monitor such that multiple viewers can view a single screen. In some embodiments, display screen 910 includes two screens, one for each eye; these screens can have separate signals for stereoscopic viewing. In some embodiments, receiver 915 is mounted on display 900 (as shown in FIG. 9), alternatively, receiver 915 can be a separate unit that is connected using a wire to display 900. In some embodiments, display 900 is mounted on control transmitter 800.

FIG. 10A illustrates a side view of an unmanned aerial vehicle (UAV) experiencing lift and thrust.

In particular, the UAV 100 is experiencing lift 1010 that is perpendicular to the surface 110 and away from the surface 110. This direction may also be describes as parallel and opposite to the direction of gravity. The lift 1010 may be provided by the airflow output through the pores in the surface 110, or by the motorized propellers of the UAV 100 itself, or some combination thereof. While the direction of lift 1010 is perpendicular to the surface 110 and away from the surface 110, this does not mean that the airflow output through the pores of the surface 110 necessarily moves exactly perpendicular to the surface 110—rather, only a component of the airflow's force need provide the lift 1010 as illustrated in FIG. 10B (e.g., the perpendicular component 1060 of FIG. 10B). Similarly, this does not mean that any force supplied by the motorized propellers of the UAV 100 is necessarily exactly perpendicular to the surface 110—rather, only a component of the force supplied by the motorized propellers need provide the lift 1010 as illustrated in FIG. 10B (e.g., the perpendicular component 1060 of FIG. 10B).

The UAV 100 is also experiencing thrust 1020 in a direction that is parallel to the surface 110. This direction may also be describes as perpendicular to the direction of gravity. The thrust 1020 may be provided by the airflow output through the pores in the surface 110, or by the motorized propellers of the UAV 100 itself, or some combination thereof. While the direction of thrust 1020 is parallel to the surface 110, this does not mean that the airflow output through the pores of the surface 110 necessarily moves exactly parallel to the surface 110—rather, only a component of the airflow's force need provide the thrust 1020 as illustrated in FIG. 10B (e.g., the parallel component 1070 of FIG. 10B). Similarly, this does not mean that any force supplied by the motorized propellers of the UAV 100 is necessarily exactly parallel to the surface 110—rather, only a component of the force supplied by the motorized propellers need provide the thrust 1020 as illustrated in FIG. 10B (e.g., the parallel component 1070 of FIG. 10B).

FIG. 10B illustrates a force diagram of an airflow output by the arena.

The airflow force 1040 is illustrated at an acute angle from the surface 110. The force diagram of FIG. 10B illustrates that the airflow force 1040 includes two components, namely a "perpendicular" or "vertical" component 1060 and a "parallel" or "horizontal" component 1070.

The "perpendicular" or "vertical" component 1060 is perpendicular to the surface 110 and typically along the same vector direction as the gravitational force. The perpendicular component 1060 may provide lift 1010 to the UAV 100 as illustrated in FIG. 10A.

The "parallel" or "horizontal" component 1070 is parallel to the surface 110 and typically along the vector direction that is perpendicular to the gravitational force. The parallel component 1070 may provide thrust 1020 to the UAV 100 as illustrated in FIG. 10A.

The airflow force 1040 may be at an angle as illustrated in FIG. 10B for a number of reasons. In some embodiments of the arena, the fan(s) 125 may themselves be capable of being tilted, and such tilting may be actuated by a motor over a duration of time, for example in response to a signal from the control transmitter 800. The arena may also channel the airflow from fan(s) 125 in ways that causes the airflow to be output at an angle, such as via angled tubes. In situations with multiple fans 12 as in FIG. 1A, the combined airflow of multiple fans 125 may be output at an angle due to disparity between magnitude of airflow force output by different fans in a region, for example by supplying more power to a first fan 125 than to a second fan 125 right next to the first.

While airflow force 1040 is illustrated at an acute angle from the surface 110, though it should be understood that any angle is possible, including a right angle or an obtuse angle.

While the force 1040 is labeled as an "airflow" force, it should be understood that this also applies to any force generated by the motorized propellers of the UAV 100. That is, a force generated by the motorized propellers of the UAV 100 may also be broken down into component forces whose vector directions are the same as the perpendicular component 1060 and the parallel component 1070 of FIG. 10B.

Figure 11:
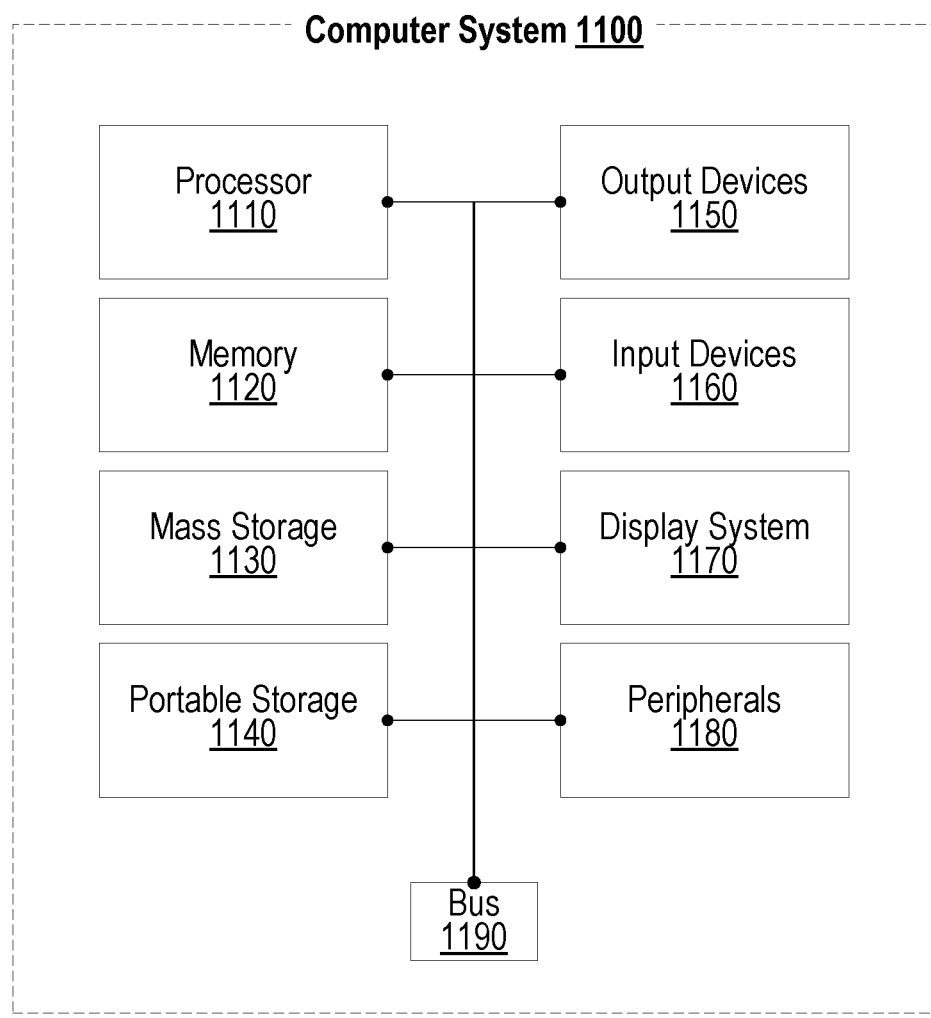
FIG. 11 is a block diagram of an exemplary computing device that may be used to implement an embodiment of the present invention.

FIG. 11 illustrates an exemplary computing system 1100 that may be used to implement an embodiment of the present invention. For example, any of the computer systems or computerized devices herein, such as the UAV 100, the control transmitter 800, the display 900, or the arena device 180 may, in at least some cases, include at least one computing system 1100. The computing system 1100 of FIG. 11 includes one or more processors 1110 and memory 1110. Main memory 1110 stores, in part, instructions and data for execution by processor 1110. Main memory 1110 can store the executable code when in operation. The system 1100 of FIG. 11 further includes a mass storage device 1130, portable storage medium drive(s) 1140, output devices 1150, user input devices 1160, a graphics display 1170, and peripheral devices 1180.

The components shown in FIG. 11 are depicted as being connected via a single bus 1190. However, the components may be connected through one or more data transport means. For example, processor unit 1110 and main memory 1110 may be connected via a local microprocessor bus, and the mass storage device 1130, peripheral device(s) 1180, portable storage device 1140, and display system 1170 may be connected via one or more input/output (I/O) buses.

Mass storage device 1130, which may be implemented with a magnetic disk drive or an optical disk drive, is a non-volatile storage device for storing data and instructions for use by processor unit 1110. Mass storage device 1130 can store the system software for implementing embodiments of the present invention for purposes of loading that software into main memory 1110.

Portable storage device 1140 operates in conjunction with a portable non-volatile storage medium, such as a floppy disk, compact disk or Digital video disc, to input and output data and code to and from the computer system 1100 of FIG. 11. The system software for implementing embodiments of the present invention may be stored on such a portable medium and input to the computer system 1100 via the portable storage device 1140.

Input devices 1160 provide a portion of a user interface. Input devices 1160 may include an alpha-numeric keypad, such as a keyboard, for inputting alpha-numeric and other information, or a pointing device, such as a mouse, a trackball, stylus, or cursor direction keys. Additionally, the system 1100 as shown in FIG. 11 includes output devices 1150. Examples of suitable output devices include speakers, printers, network interfaces, and monitors.

Display system 1170 may include a liquid crystal display (LCD), a plasma display, an organic light-emitting diode (OLED) display, an electronic ink display, a projector-based display, a holographic display, or another suitable display device. Display system 1170 receives textual and graphical information, and processes the information for output to the display device. The display system 1170 may include multiple-touch touchscreen input capabilities, such as capacitive touch detection, resistive touch detection, surface acoustic wave touch detection, or infrared touch detection. Such touchscreen input capabilities may or may not allow for variable pressure or force detection.

Peripherals 1180 may include any type of computer support device to add additional functionality to the computer system. For example, peripheral device(s) 1180 may include a modem or a router.

The components contained in the computer system 1100 of FIG. 11 are those typically found in computer systems that may be suitable for use with embodiments of the present invention and are intended to represent a broad category of such computer components that are well known in the art. Thus, the computer system 1100 of FIG. 11 can be a personal computer, a hand held computing device, a telephone ("smart" or otherwise), a mobile computing device, a workstation, a server (on a server rack or otherwise), a minicomputer, a mainframe computer, a tablet computing device, a wearable device (such as a watch, a ring, a pair of glasses, or another type of jewelry/clothing/accessory), a video game console (portable or otherwise), an e-book reader, a media player device (portable or otherwise), a vehicle-based computer, some combination thereof, or any other computing device. The computer system 1100 may in some cases be a virtual computer system executed by another computer system. The computer can also include different bus configurations, networked platforms, multi-processor platforms, etc. Various operating systems can be used including Unix, Linux, Windows, Macintosh OS, Palm OS, Android, iOS, and other suitable operating systems.

In some cases, the computer system 1100 may be part of a multi-computer system that uses multiple computer systems 1100, each for one or more specific tasks or purposes. For example, the multi-computer system may include multiple computer systems 1100 communicatively coupled together via at least one of a personal area network (PAN), a local area network (LAN), a wireless local area network (WLAN), a municipal area network (MAN), a wide area network (WAN), or some combination thereof. The multi-computer system may further include multiple computer systems 1100 from different networks communicatively coupled together via the Internet (also known as a "distributed" system).

The foregoing detailed description of the technology has been presented for purposes of illustration and description. It is not intended to be exhaustive or to limit the technology to the precise form disclosed. Many modifications and variations are possible in light of the above teaching. The described embodiments were chosen in order to best explain the principles of the technology, its practical application, and to enable others skilled in the art to utilize the technology in various embodiments and with various modifications as are suited to the particular use contemplated. It is intended that the scope of the technology be defined by the claim.

What is claimed is:

1. A system for movement control, the system comprising:
a porous surface comprising a plurality of pores;
an air propulsion device that generates an airflow that is output through the plurality of pores in the porous surface, wherein the airflow provides lift to an unmanned vehicle, wherein at least a vector component of the lift is perpendicular to the porous surface and pushes the unmanned vehicle away from the porous surface; and
an airflow regulation mechanism that is actuated to move between a first position and a second position, wherein the airflow regulation mechanism allows the airflow to pass through a first pore of the plurality of pores in an initial direction when the airflow regulation mechanism is in the first position, and wherein the airflow regulation mechanism redirects the airflow in a different direction through the first pore of the plurality of pores when the actuated airflow regulation mechanism is in the second position.

2. The system of claim 1, wherein the actuated airflow regulation mechanism includes a valve, and wherein the actuated airflow regulation mechanism redirects the airflow though the first pore by at least partially occluding the airflow through the first pore.

3. The system of claim 1, wherein the actuated airflow regulation mechanism includes a cover for the first pore, and wherein the actuated airflow regulation mechanism redirects the airflow though the first pore by at least partially occluding the airflow through the first pore.

4. The system of claim 1, wherein the actuated airflow regulation mechanism includes a steerable pore channel with first opening and a second opening, and wherein the actuated airflow regulation mechanism redirects the airflow though the first pore by moving the steerable pore channel so that a vector running from the first opening of the steerable pore channel to the second opening of the steerable pore channel changes direction.

5. The system of claim 4, wherein the steerable pore channel includes a steerable ball joint.

6. The system of claim 1, wherein the actuated airflow regulation mechanism includes a fan that generates a second airflow that redirects the airflow though the first pore using the second airflow.

7. The system of claim 1, wherein the actuated airflow regulation mechanism redirects the airflow through the first pore to provide thrust to the unmanned vehicle, wherein at least a vector component of the thrust is parallel to the porous surface.

8. The system of claim 1, wherein the actuated airflow regulation mechanism is actuated to move between the first position and the second position in response to receipt of a signal from the unmanned vehicle.

9. The system of claim 1, further comprising a controller user input device that receives input, wherein the actuated airflow regulation mechanism is actuated to move between the first position and the second position in response to the input received at the controller user input device.

10. The system of claim 1, wherein the air propulsion device includes a fan, wherein rotation of the fan generates the airflow.

11. A system for movement control, the system comprising:
a porous surface comprising a plurality of pores;
an air propulsion device that generates an airflow that is output through the plurality of pores in the porous surface, wherein the airflow provides lift to an unmanned vehicle, wherein at least a vector component of the lift is perpendicular to the porous surface and pushes the unmanned vehicle away from the porous surface; and
a plurality of actuated airflow regulation mechanisms, wherein the plurality of actuated airflow regulation mechanisms regulate output of the airflow through the plurality of pores in the porous surface so that the airflow is output differently at a first pore of the plurality of pores than at a second pore of the plurality of pores.

12. The system of claim 11, wherein the airflow that is output differently at the first pore than at the second pore comprises airflow that is output more quickly at the first pore than at the second pore.

13. The system of claim 11, wherein the airflow that is output differently at the first pore than at the second pore comprises airflow that is output more forcefully at the first pore than at the second pore.

14. The system of claim 11, wherein the airflow that is output differently at the first pore than at the second pore comprises airflow that is output in a different direction at the first pore than at the second pore.

15. The system of claim 11, wherein the first pore is one of a first set of pores at which the airflow is output in a first manner, and wherein the second pore is one of a second set of pores at which the airflow is output in a second manner, wherein the first set of pores and the second set of pores are subsets of the plurality of pores.

16. The system of claim 11, further comprising a communication transceiver that receives a signal, wherein at least one of the plurality of actuated airflow regulation mechanisms automatically actuates partially occludes the first pore in response to receipt of the signal at the communication transceiver.

17. A method for movement control, the method comprising:
transmitting an activation signal to an arena system, wherein the arena system generates an airflow in response to receipt of the activation signal, the airflow being output through a surface of the arena system and providing lift to an unmanned vehicle that pushes the unmanned vehicle away from the surface of the arena system;
receiving a thrust input via an input interface; and
transmitting a thrust signal to the arena system in response to receipt of the thrust input, wherein the arena system actuates an airflow regulation mechanism in response to receipt of the thrust signal, the actuated airflow regulation mechanism modifying the airflow that is output through the surface of the arena system, wherein the modified airflow provides thrust to the unmanned vehicle, wherein at least a vector component of the thrust is perpendicular to at least a vector component of the lift and moves the unmanned vehicle in a direction along the surface in accordance with the thrust signal.

18. The method of claim 17, wherein the input interface includes a joystick.

19. The method of claim 17, further comprising executing a processor housed in the unmanned vehicle, wherein the processor identifies the thrust signal to transmit based on the thrust input.

20. A system for movement control, the system comprising:
   a surface; and
   an array of electromagnets arranged adjacent to the surface, wherein a magnetic field generated by the array of electromagnets provides lift and thrust to an unmanned vehicle that includes at least one vehicle-based magnet, wherein at least a vector component of the lift is perpendicular to the surface and pushes the unmanned vehicle away from the surface and at least a vector component of the thrust is parallel to the surface and moves the unmanned vehicle in a direction along the surface.

\* \* \* \* \*